US012307761B2

(12) United States Patent
Servadei et al.

(10) Patent No.: US 12,307,761 B2
(45) Date of Patent: May 20, 2025

(54) SCENE-ADAPTIVE RADAR

(71) Applicant: Infineon Technologies AG, Neubiberg (DE)

(72) Inventors: Lorenzo Servadei, Munich (DE); Michael Stephan, Neubiberg (DE); Avik Santra, Munich (DE)

(73) Assignee: Infineon Technologies AG, Neubiberg (DE)

( * ) Notice: Subject to any disclaimer, the term of this patent is extended or adjusted under 35 U.S.C. 154(b) by 715 days.

(21) Appl. No.: 17/396,032

(22) Filed: Aug. 6, 2021

(65) Prior Publication Data
US 2023/0040007 A1    Feb. 9, 2023

(51) Int. Cl.
*G01S 13/89*    (2006.01)
*G06N 3/045*    (2023.01)
*G06N 3/08*    (2023.01)
*G06V 20/17*    (2022.01)
*G06V 20/10*    (2022.01)

(52) U.S. Cl.
CPC .............. *G06V 20/17* (2022.01); *G01S 13/89* (2013.01); *G06N 3/045* (2023.01); *G06N 3/08* (2013.01); *G06V 20/194* (2022.01)

(58) Field of Classification Search
CPC ...... G06V 20/17; G06V 20/194; G01S 13/89; G01S 13/343; G01S 13/726; G01S 13/931; G01S 7/414; G01S 7/415; G01S 7/417; G06N 3/045; G06N 3/08; G06N 3/0464; G06N 3/084; G06N 3/092
See application file for complete search history.

(56) References Cited

U.S. PATENT DOCUMENTS 4,241,347 A    12/1980    Albanese et al.
6,147,572 A    11/2000    Kaminski et al.
6,414,631 B1    7/2002    Fujimoto
(Continued)

FOREIGN PATENT DOCUMENTS

CN    1463161 A    12/2003
CN    1716695 A    1/2006
(Continued)

OTHER PUBLICATIONS

Vinci, Gabor et al., "Microwave Interferometer Radar-Based Vital Sign Detection for Driver Monitoring Systems", IEEE MTT-S International Conference on Microwaves for Intelligent Mobility, Apr. 27-29, 2015, 4 pages.
(Continued)

*Primary Examiner* — Timothy A Brainard
(74) *Attorney, Agent, or Firm* — Slater Matsil, LLP

(57)    ABSTRACT

In an embodiment, a method includes: receiving first radar data from a millimeter-wave radar sensor; receiving a set of hyperparameters with a radar processing chain; generating a first radar processing output using the radar processing chain based on the first radar data and the set of hyperparameters; updating the set of hyperparameters based on the first radar processing output using a hyperparameter selection neural network; receiving second radar data from the millimeter-wave radar sensor; and generating a second radar processing output using the radar processing chain based on the second radar data and the updated set of hyperparameters.

26 Claims, 11 Drawing Sheets

(56) References Cited

U.S. PATENT DOCUMENTS

| | | | |
|---|---|---|---|
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2 | 1/2008 | Arikan et al. | |
| 7,596,241 B2 | 9/2009 | Rittscher et al. | |
| 7,692,574 B2 | 4/2010 | Nakagawa | |
| 7,873,326 B2 | 1/2011 | Sadr | |
| 7,889,147 B2 | 2/2011 | Tam et al. | |
| 8,228,382 B2 | 7/2012 | Pattikonda | |
| 8,497,805 B2 | 7/2013 | Rofougaran et al. | |
| 8,659,369 B2 | 2/2014 | Rofougaran et al. | |
| 8,731,502 B2 | 5/2014 | Salle et al. | |
| 8,836,596 B2 | 9/2014 | Richards et al. | |
| 8,847,814 B2 | 9/2014 | Himmelstoss et al. | |
| 8,860,532 B2 | 10/2014 | Gong et al. | |
| 8,976,061 B2 | 3/2015 | Chowdhury | |
| 9,172,132 B2 | 10/2015 | Kam et al. | |
| 9,182,476 B2 | 11/2015 | Wintermantel | |
| 9,202,105 B1 | 12/2015 | Wang et al. | |
| 9,413,079 B2 | 8/2016 | Kamgaing et al. | |
| 9,495,600 B2 | 11/2016 | Heu et al. | |
| 9,886,095 B2 | 2/2018 | Pothier | |
| 9,935,065 B1 | 4/2018 | Baheti et al. | |
| 10,795,012 B2 | 10/2020 | Santra et al. | |
| 10,958,287 B1* | 3/2021 | Sanderovich | G06F 9/3885 |
| 11,380,108 B1* | 7/2022 | Cai | G06N 3/08 |
| 2003/0179127 A1 | 9/2003 | Wienand | |
| 2004/0238857 A1 | 12/2004 | Beroz et al. | |
| 2006/0001572 A1 | 1/2006 | Gaucher et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0315761 A1 | 12/2009 | Walter et al. | |
| 2010/0207805 A1 | 8/2010 | Haworth | |
| 2011/0299433 A1 | 12/2011 | Darabi et al. | |
| 2012/0087230 A1 | 4/2012 | Guo et al. | |
| 2012/0092284 A1 | 4/2012 | Rofougaran et al. | |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0265486 A1 | 10/2012 | Klofer et al. | |
| 2012/0268314 A1 | 10/2012 | Kuwahara et al. | |
| 2012/0280900 A1 | 11/2012 | Wang et al. | |
| 2013/0027240 A1 | 1/2013 | Chowdhury | |
| 2013/0106673 A1 | 5/2013 | McCormack et al. | |
| 2014/0028542 A1 | 1/2014 | Lovitt et al. | |
| 2014/0050368 A1* | 2/2014 | Poulsen | G06V 20/182 382/113 |
| 2014/0070994 A1 | 3/2014 | Schmalenberg et al. | |
| 2014/0145883 A1 | 5/2014 | Baks et al. | |
| 2014/0324888 A1 | 10/2014 | Xie et al. | |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 | 10/2015 | Sprenger et al. | |
| 2015/0325925 A1 | 11/2015 | Kamgaing et al. | |
| 2015/0346820 A1 | 12/2015 | Poupyrev et al. | |
| 2015/0348821 A1 | 12/2015 | Wanaga et al. | |
| 2015/0364816 A1 | 12/2015 | Murugan et al. | |
| 2016/0018511 A1 | 1/2016 | Nayyar et al. | |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0135655 A1 | 5/2016 | Ahn et al. | |
| 2016/0146931 A1 | 5/2016 | Rao et al. | |
| 2016/0146933 A1 | 5/2016 | Rao et al. | |
| 2016/0178730 A1 | 6/2016 | Trotta et al. | |
| 2016/0187462 A1 | 6/2016 | Altus et al. | |
| 2016/0191232 A1 | 6/2016 | Subburaj et al. | |
| 2016/0223651 A1 | 8/2016 | Kamo et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 | 11/2016 | Poupyrev | |
| 2016/0320853 A1 | 11/2016 | Lien et al. | |
| 2016/0327633 A1 | 11/2016 | Kumar Y.B. et al. | |
| 2016/0334502 A1 | 11/2016 | Ali et al. | |
| 2016/0349845 A1 | 12/2016 | Poupyrev et al. | |
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |
| 2017/0060254 A1 | 3/2017 | Molchanov et al. | |
| 2017/0070952 A1 | 3/2017 | Balakrishnan et al. | |
| 2017/0074974 A1 | 3/2017 | Rao et al. | |
| 2017/0074980 A1 | 3/2017 | Adib et al. | |
| 2017/0090014 A1 | 3/2017 | Subburaj et al. | |
| 2017/0090015 A1 | 3/2017 | Breen et al. | |
| 2017/0115377 A1 | 4/2017 | Giannini et al. | |
| 2017/0131395 A1 | 5/2017 | Reynolds et al. | |
| 2017/0139036 A1 | 5/2017 | Nayyar et al. | |
| 2017/0141453 A1 | 5/2017 | Waelde et al. | |
| 2017/0170947 A1 | 6/2017 | Yang | |
| 2017/0176574 A1 | 6/2017 | Eswaran et al. | |
| 2017/0192847 A1 | 7/2017 | Rao et al. | |
| 2017/0201019 A1 | 7/2017 | Trotta | |
| 2017/0212597 A1 | 7/2017 | Mishra | |
| 2017/0364160 A1 | 12/2017 | Malysa et al. | |
| 2018/0046255 A1 | 2/2018 | Rothera et al. | |
| 2018/0071473 A1 | 3/2018 | Trotta et al. | |
| 2018/0101239 A1 | 4/2018 | Yin et al. | |
| 2018/0348343 A1 | 12/2018 | Achour et al. | |
| 2020/0103498 A1* | 4/2020 | Frank | G01S 7/411 |
| 2020/0272148 A1 | 8/2020 | Karasev et al. | |
| 2021/0114553 A1* | 4/2021 | Awtar | A61B 5/1113 |
| 2021/0116540 A1 | 4/2021 | Santra et al. | |
| 2021/0365038 A1* | 11/2021 | Ma | G05D 1/0248 |
| 2022/0067884 A1* | 3/2022 | Beaudoin | G06T 5/60 |
| 2022/0138568 A1* | 5/2022 | Smolyanskiy | G06N 3/044 706/21 |
| 2022/0196798 A1* | 6/2022 | Chen | G01S 13/89 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |

(56) References Cited

FOREIGN PATENT DOCUMENTS

| | | |
|---|---|---|
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Vinci, Gabor et al., "Six-Port Radar Sensor for Remote Respiration Rate and Heartbeat Vital-Sign Monitoring", IEEE Transactions on Microwave Theory and Techniques, vol. 61, No. 5, May 2013, pp. 2093-2100.

Wang, Fu-Kang et al., "Wrist Pulse Rate Monitor Using Self-Injection-Locked Radar Technology", Biosensors, MDPI, Oct. 26, 2016, 12 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Will, Christoph et al., "Advanced Template Matching Algorithm for Instantaneous Heartbeat Detection using Continuous Wave Radar Systems", ResearchGate, May 2017, 5 pages.

Will, Christoph et al., "Human Target Detection, Tracking, and Classification Using 24-GHz FMCW Radar", IEEE Sensors Journal, vol. 19, No. 17, Sep. 1, 2019, pp. 7283-7299.

Will, Christoph et al., "Local Pulse Wave Detection using Continuous Wave Radar Systems", IEEE Journal of Electromagnetics, RF and Microwaves in Medicine and Biology, Oct. 25, 2017, 9 pages.

Will, Christoph et al., "Radar-Based Heart Sound Detection", Scientific Reports, www.nature.com/scientificreports, Jul. 26, 2018, 15 pages.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.

Cheikh, K., et al., "Application of neural networks to radar signal detection in K-distributed clutter", The Institute of Engineering and Technology, IEEE Proceedings No. 20050103, doi:10.1049/ip-rsn:20050103, IEEE Proc.-Radar Sonar Navig., vol. 153, No. 5, Oct. 2006, 8 pages.

Bengio, Y. et al., "Curriculum Learning," Journal of the American Podiatry Association, Jan. 2009, 8 pages.

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chioukh, Lydia et al., "Noise and Sensitivity of Harmonic Radar Architecture for Remote Sensing and Detection of Vital Signs", IEEE Transactions on Microwave Theory and Techniques, vol. 62, No. 9, Sep. 2014, pp. 1847-1855.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dong, X. et al., "Hyperparameter Optimization for Tracking with Continuous Deep Q-Learning," IEEE, Dec. 17, 2018, 10 pages.

Gigie, Andrew et al., "Novel Approach for Vibration Detection Using Indented Radar", Progess in Electromagnetic Research C, vol. 87, pp. 147-162, Oct. 4, 2018.

Gouveia, Carolina et al., "A Review on Methods for Random Motion Detection and Compensation in Bio-Radar Systems", Sensors, MDPI, Jan. 31, 2019, 17 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Gu, Changzhan et al., "Deep Neural Network based Body Movement Cancellation for Doppler Radar Vital Sign Detection", IEEE MTT-S International Wireless Symposium (IWS) May 19-22, 2019, 3 pages.

Gu, Changzhu "Short-Range Noncontact Sensors for Healthcare and Other Emerginng Applications: A Review", Sensors, MDPI, Jul. 26, 2016, 24 pages.

Gu, Changzhan et al., "From Tumor Targeting to Speed Monitoring", IEEE Microwave Magazine, ResearchGate, Jun. 2014, 11 pages.

Gu, S. et al., "Continuous Deep Q-Learning with Model-based Acceleration," arXiv:1603.00748v1 [cs.LG], Mar. 2, 2016, 13 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Hu, Wei et al., "Noncontact Accurate Measurement of Cardiopulmonary Activity Using a Compact Quadrature Doppler Radar Sensor", IEEE Transactions on Biomedical Engineering, vol. 61, No. 3, Mar. 2014, pp. 725-735.

Immoreev, I. Ya. "Ultrawideband Radars: Features and Capabilities", Journal of Communications Technology and Electronics, ISSN: 1064-2269, vol. 54, No. 1, Feb. 8, 2009, pp. 1-26.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Killedar, Abdulraheem "XWR1xxx Power Management Optimizations—Low Cost LC Filter Solution," Application Report SWRA577, Texas Instruments, Oct. 2017, 19 pages.

Kishore, N. et al., "Millimeter Wave Antenna for Intelligent Transportation Systems Application", Journal of Microwaves, Optoelectronics and Electromagnetic Applications, vol. 17, No. 1, Mar. 2018, pp. 171-178.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Li, Changzhi et al., "A Review on Recent Advances in Doppler Radar Sensors for Noncontact Healthcare Monitoring", IEEE Transactions on Microwave Theory and Techniques, vol. 61, No. 5, May 2013, pp. 2046-2060.

Li, Changzhi et al., "A Review on Recent Progress of Portable Short-Range Noncontact Microwave Radar Systems", IEEE Transactions on Microwave Theory and Techniques, vol. 65, No. 5, May 2017, pp. 1692-1706.

Li, Changzhi et al., "Random Body Movement Cancellation in Doppler Radar Vital Sign Detection", IEEE Transactions on Microwave Theory and Techniques, vol. 56, No. 12, Dec. 2008, pp. 3143-3152.

Li, Changzhi et al., "Robust Overnight Monitoring of Human Vital Signs by a Non-contact Respiration and Heartbeat Detector", IEEE

(56) References Cited

OTHER PUBLICATIONS

Proceedings of the 28th EMBS Annual International Conference, FrA05.5, Aug. 30-Sep. 3, 2006, 4 pages.
Li, Changzhi "Vital-sign monitoring on the go", Sensors news and views, www.nature.com/naturelectronics, Nature Electronics, vol. 2, Jun. 2019, 2 pages.
Lillicrap, T. et al., "Continuous Control with Deep Reinforcement Learning," ICLR 2016, arXiv:1509.02971v6 [cs.LG], Jul. 5, 2019, 14 pages.
Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.
Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.
Massagram, Wansuree et al., "Assessment of Heart Rate Variability and Respiratory Sinus Arrhythmia via Doppler Radar", IEEE Transactions on Microwave Theory and Techniques, vol. 57, No. 10, Oct. 2009, pp. 2542-2549.
Mercuri, Marco et al., "Vital-sign monitoring and spatial tracking of multiple people using a contactless radar-based sensor", Nature Electronics, vol. 2, Articles, https://doi.org/10.1038/s41928-019-0258-6, Jun. 2019, 13 pages.
Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.
Mostov, K., et al., "Medical applications of shortwave FM radar: Remote monitoring of cardiac and respiratory motion", Am. Assoc. Phys. Med., 37(3), Mar. 2010, pp. 1332-1338.
Oguntala, G et al., "Indoor location identification technologies for real-time IoT-based applications: an inclusive survey", Elsevier Inc., http://hdl.handle.net/10454/16634, Oct. 2018, 21 pages.
Peng, Zhengyu et al., "A Portable FMCW Interferometry Radar with Programmable Low-IF Architecture for Localization, ISAR Imaging, and Vial Sign Tracking", IEEE Transactions on Microwave Theory and Techniques, Dec. 15, 2016, 11 pages.
Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.
Richards, Mark A., "Fundamentals of Radar Signal Processing," McGraw Hill Electronic Engineering, ISBN: 0-07-144474-2, Jun. 2005, 93 pages.
Sakamoto, Takuya et al., "Feature-Based Correlation and Topological Similarity for Interbeat Interval Estimation Using Ultrawideband Radar", IEEE Transactions on Biomedical Engineering, vol. 63, No. 4, Apr. 2016, pp. 747-757.
Santra, Avik et al., "Short-range multi-mode continuous-wave radar for vital sign measurement and imaging", ResearchGate, Conference Paper, Apr. 2018, 6 pages.
Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.
Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.
Singh, Aditya et al., "Data-Based Quadrature Imbalance Compensation for a CW Doppler Radar System", https://www.researchgate.net/publication/258793573, IEEE Transactions on Microwave Theory and Techniques, Apr. 2013, 7 pages.
Suleymanov, Suleyman, "Design and Implementation of an FMCW Radar Signal Processing Module for Automotive Applications," Master Thesis, University of Twente, Aug. 31, 2016, 64 pages.
Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.
Thayaparan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.
Tu, Jianxuan et al., "Fast Acquisition of Heart Rate in Noncontact Vital Sign Radar Measurement Using Time-Window-Variation Technique", IEEE Transactions on Instrumentation and Measurement, vol. 65, No. 1, Jan. 2016, pp. 112-122.

* cited by examiner

SCENE-ADAPTIVE RADAR

TECHNICAL FIELD

The present disclosure relates generally to an electronic system and method, and, in particular embodiments, to a scene-adaptive radar.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at e.g., 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmitting antenna for transmitting the radio-frequency (RF) signal, and a receiving antenna for receiving the reflected RF signal, as well as the associated RF circuits used to generate the transmitted signal and to receive the RF signal. In some radar systems, multiple antennas may be used to implement directional beams using phased array techniques. A multiple-input and multiple-output (MIMO) configuration with multiple chipsets can be used to perform coherent and non-coherent signal processing.

SUMMARY

In accordance with an embodiment, a method includes: receiving first radar data from a millimeter-wave radar sensor; receiving a set of hyperparameters with a radar processing chain; generating a first radar processing output using the radar processing chain based on the first radar data and the set of hyperparameters; updating the set of hyperparameters based on the first radar processing output using a hyperparameter selection neural network; receiving second radar data from the millimeter-wave radar sensor; and generating a second radar processing output using the radar processing chain based on the second radar data and the updated set of hyperparameters.

In accordance with an embodiment, a method includes: receiving first radar data from a millimeter-wave radar sensor; receiving a set of hyperparameters with a radar processing chain including a tracker; generating a first radar image using the radar processing chain based on the first radar data and the set of hyperparameters; tracking a target using the tracker based on the first radar image and the set of hyperparameters; updating the set of hyperparameters based on the first radar image using a hyperparameter selection neural network; receiving second radar data from the millimeter-wave radar sensor; and generating a second radar image using the radar processing chain based on the second radar data and the updated set of hyperparameters.

In accordance with an embodiment, a millimeter-wave radar system includes: a millimeter-wave radar sensor configured to transmit radar signals and receive reflected radar signals, and generate radar data based on the reflected radar signals; and a processing system including: a radar processing chain configured to generate a first radar processing output based on the radar data and a set of hyperparameters, and a hyperparameter selection neural network configured to update the set of hyperparameters based on the first radar processing output, where the radar processing chain is configured to generate a second radar processing output based on the radar data and the updated set of hyperparameters.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise

DETAILED DESCRIPTION OF ILLUSTRATIVE EMBODIMENTS

Figure 1:
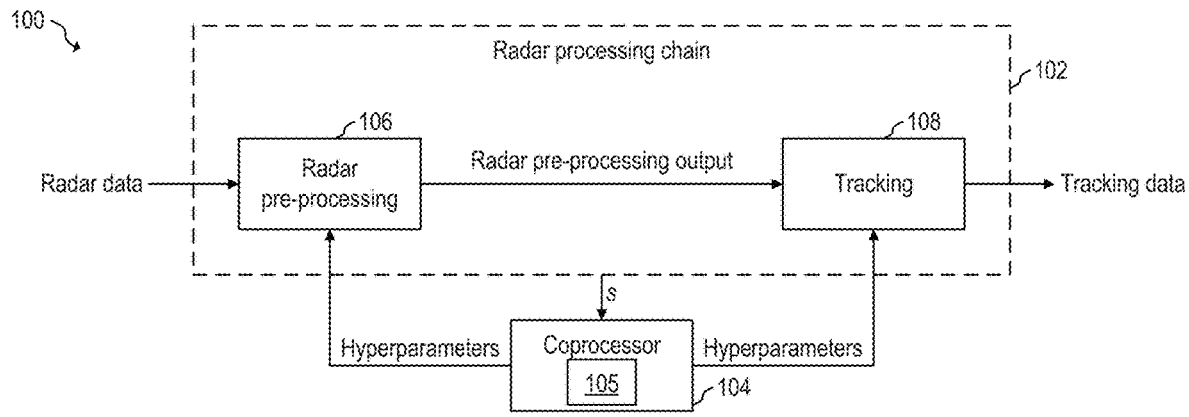
FIG. 1 shows a block diagram of a radar processing system, according to an embodiment of the present invention.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a millimeter-wave radar system for tracking targets (e.g., such as human targets) using scene-adaptive hyperparameters. Some embodiments may implement a radar processing chain that does not perform tracking of a target. Some embodiments may be implemented in regimes different than millimeter-wave.

In an embodiment of the present invention, a scene-adaptive radar system dynamically updates one or more hyperparameters of a radar processing chain based on scene sensed by the radar processing chain. A coprocessor that includes a hyperparameter selection neural network provides the updated hyperparameters to the radar processing chain. By dynamically updating the hyperparameters of the radar processing chain, some embodiments are advantageously capable of adapting and obtaining optimal (or better) radar performance (e.g., tracking performance, location accuracy, etc.) under any given scene.

Radar applications generally include a radar processing chain that receives several hyperparameters that (e.g., strongly) influence the radar performance. A hyperparameter may be understood as a configuration variable that affects the radar performance of the radar system.

Traditionally, hyperparameters of a radar system are chosen based on manual tuning or by using offline optimization methods (e.g., grid search, random search of Bayesian search) and are fixed after the hyperparameter values are selected. Thus, traditionally, the hyperparameter of a radar system are constant once the radar system is deployed.

Several of the hyperparameters applied to the radar processing chain may be sensitive to the scene (e.g., the environment sensed by the radar sensor) in which the radar sensor is deployed. For example, some hyperparameters may be sensitive to the angle, range, and orientation of the target with respect to the radar sensor, the number of targets present in the field-of-view of the radar sensor, clutter present in the field-of-view of the radar sensor, the characteristics of the target (e.g., size, velocity of movement, etc.), etc. For example, a higher detection threshold may be used when targets are closer to the radar sensor (lower ranges) than when targets are farther from the radar sensor (higher ranges). Thus, the selected (fixed) hyperparameters are generally optimized for a sub-set of scenarios associated with the environment in which the radar sensor is to be deployed (e.g., one or two targets in a small room).

In an embodiment of the present invention, a radar processing chain includes a radar pre-processing module that generates radar pre-processing outputs (e.g., radar images), a tracking module that tracks one or more targets based on the radar pre-processing outputs, and a coprocessor that provides a set of hyperparameters to the radar pre-processing module and to the tracking module. The coprocessor dynamically updates one or more hyperparameters of the set of hyperparameters based on radar processing outputs of the radar processing chain (e.g., outputs from the radar pre-processing module and/or outputs from the tracking module).

FIG. 1 shows a block diagram of radar processing system 100, according to an embodiment of the present invention. Radar processing system 100 includes radar processing chain 102 and coprocessor 104. Radar processing chain includes radar pre-processing module 106 and tracking module 108. Coprocessor 105 includes hyperparameter selection neural network 105.

During normal operation, radar pre-processing module 106 receives radar data, e.g., from a millimeter-wave radar sensor (e.g., 1202), and process the radar data to generate a radar pre-processing output s (e.g., a radar image, a radar time series). As radar pre-processing module 106 receives radar data, radar pre-processing module 106 generates corresponding radar pre-processing outputs s. Tracking module 108 receives the radar pre-processing outputs and tracks one or more target based on the radar pre-processing outputs.

Coprocessor 104 receives radar processing outputs (e.g., outputs from radar pre-processing module 106 and/or outputs from tracking module 108) and provides updated hyperparameters to radar pre-processing module 106 and/or to tracking module 108 based on the radar processing outputs, e.g., to adapt (e.g., optimize) radar performance to the scenes associated with the radar data. In some embodiments, the updated hyperparameters are advantageously used by radar pre-processing module 106 to generate more accurate radar pre-processing output (e.g., achieve less noise, achieve more accurate target detection, etc.). In some embodiments, the updated hyperparameters are advantageously used by tracking module 108 to improve the tracking performance (e.g., decrease false alarms, decrease misdetections, etc.).

Examples of radar processing outputs of some embodiments include, heatmaps, and/or radar images, such as range-angle images (RAIs) and range Doppler images (RDIs), e.g., before and/or after and order statistics (OS) constant false alarm rate (CFAR) (OS-CFAR) detector (e.g., from a last frame of radar data and/or from an aggregation of previous frames of radar data).

In some embodiments, coprocessor 104 provides updated hyperparameters to radar pre-processing module 106 without updating the hyperparameters of tracking module 108. In some embodiments, coprocessor 104 provides updated hyperparameters to tracking module 108 without updating the hyperparameters of radar pre-processing module 106. In some embodiments, coprocessor 104 provides updated hyperparameters to radar pre-processing module 106 and to tracking module 108.

In some embodiments, the total number of hyperparameters provided by coprocessor 104 to radar processing chain 102 may be between 5 and 15, such as 14. In some embodiments, the number of hyperparameters provided by coprocessor 104 to radar processing chain 102 may be lower than 5, such as 4, 3, 2, or 1, or higher than 15, such as 16 or higher.

In some embodiments, coprocessor 104 updates one or more hyperparameters each time a new radar processing output is generated (e.g., each frame of radar data). In some embodiments, coprocessor 104 updates one or more hyperparameters each time step of tracking module 108. In some embodiments, coprocessor 104 may update one or more hyperparameters at a different interval, such as every n frames, or every n time steps of tracking module 108, where n is, e.g., an integer greater than or equal to 1, such as 8, 12, 16, or more.

In some embodiments, coprocessor 104 includes a hyperparameter selection neural network (105) for dynamically selecting the values of the hyperparameters based on the radar processing outputs. In some embodiments, the hyperparameter selection neural network 105 may be trained using reinforcement learning (RL), imitation learning, and/or curriculum learning.

In some embodiments, radar processing chain 102 may be implemented as a conventional radar processing chain.

In some embodiments, radar pre-processing module 106 may perform one or more of signal conditioning, low-pass filtering and background removal, as well as range FFT, Doppler FFT, beamforming, coherent integration, target detection, target clustering, movement detection, and/or localization estimation, for example.

In some embodiments, tracking module 108 may be implemented with a Kalman filter, such as an unscented Kalman filter. Other implementations are also possible.

In some embodiments, tracking module 108 generates tracking data. In some embodiments, the tracking data generated by tracking module 108 includes target(s) track history, target(s) prediction (e.g., location prediction), and/or number of targets.

In some embodiments, the tracking data may be streamed to an external circuit, such as a processor. In some embodiments, the tracking data may be stored inside coprocessor 104 and may be accessed on the demand by an external circuit (e.g., a processor). Other implementations are also possible.

In some embodiments, the radar data includes digital data generated by an analog-to-digital converter (ADC) of the millimeter-wave radar.

In some embodiments, the radar data includes separate baseband radar data from multiple antennas of the radar sensor. For example, in some embodiments, the radar data includes a datacube of slow-time samples by fast-time samples by number of receiving antennas of the millimeter-wave radar. In some embodiments, the radar data is organized in frames.

In some embodiments, each radar data includes a single frame. In some embodiments, each radar data includes a plurality of frames (e.g., 16 frames). Other implementations are also possible.

In some embodiments, radar processing chain 102 is implemented using a general purpose processor, controller or digital signal processor (DSP) that includes, for example, combinatorial circuits coupled to a memory. In some embodiments, radar processing chain 102 may be implemented using as an application specific integrated circuit (ASIC). In some embodiments, radar processing chain 102 may be implemented using an ARM, RISC, or x86 architecture, for example. In some embodiments, radar processing chain 102 may be implemented using an artificial intelligence (AI) accelerator. Some embodiments may use a combination of hardware accelerator and software running on a DSP or general purpose microcontroller for implementing radar processing chain 102. Other implementations are also possible.

In some embodiments, coprocessor 106 may be implemented using a general purpose processor, controller or digital signal processor (DSP) that includes, for example, combinatorial circuits coupled to a memory. In some embodiments, coprocessor 106 may be implemented as an application specific integrated circuit (ASIC). In some embodiments, coprocessor 106 may be implemented with an ARM, RISC, or x86 architecture, for example. In some embodiments, coprocessor 106 may include an artificial intelligence (AI) accelerator. Other implementations are also possible.

Figure 2A:
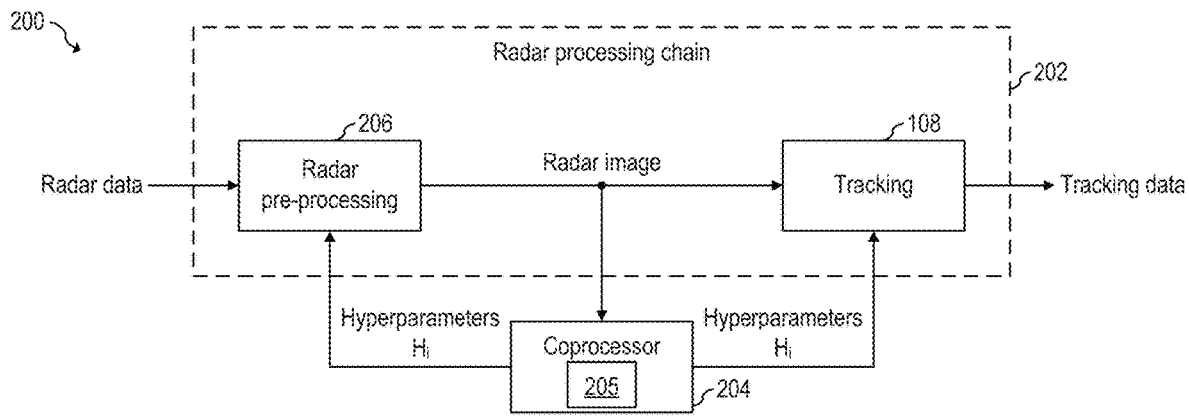
FIG. 2A shows a block diagram of a possible implementation of the radar processing system of FIG. 1, according to an embodiment of the present invention.

FIG. 2A shows a block diagram of radar processing system 200, according to an embodiment of the present invention. Radar processing system 200 includes radar processing chain 202 and coprocessor 204. Radar processing chain 202 includes radar pre-processing module 206 and tracking module 108. Radar processing system 100 may be implemented as radar processing system 200. Radar processing chain 102 may be implemented as radar processing chain 202. Radar pre-processing module 106 may be implemented as radar pre-processing module 206. Coprocessor 104 may be implemented as coprocessor 204. Hyperparameter selection neural network 105 may be implemented as hyperparameter selection neural network 205.

As shown in FIG. 2A, radar pre-processing module 206 generates a radar image based on the radar data. Coprocessor 204 provides (e.g., using hyperparameter selection neural network 205) updated hyperparameters to radar pre-processing module 206 and/or to tracking module 108 based on the radar image generated by radar pre-processing module 206 (e.g., using hyperparameter selection neural network 205).

In some embodiments, the radar image may be a range angle image (RAI) or a range Doppler image (RDI) from one or multiple frames (e.g., an aggregation of images from multiple frames). In some embodiments, the radar image may be masked, e.g., based on the output of an order statistics (OS) constant false alarm rate (CFAR) (OS-CFAR) detector. Other types of radar images may also be used.

In some embodiments, radar pre-processing module 206 generates multiple radar images that are used by coprocessor 204 to update the hyperparameters provided to radar pre-processing module 206 and/or tracking module 108. For example, in some embodiments, radar pre-processing module 206 provides to coprocessor 204 an unmasked RAI based on the current frame, a masked RAI based on the current frame, an unmasked RAI based on the aggregation of the last 32 frames, and a masked RAI based on the aggregation of the last 32 frames. Other types and combinations of radar images may also be used.

Figure 2B:
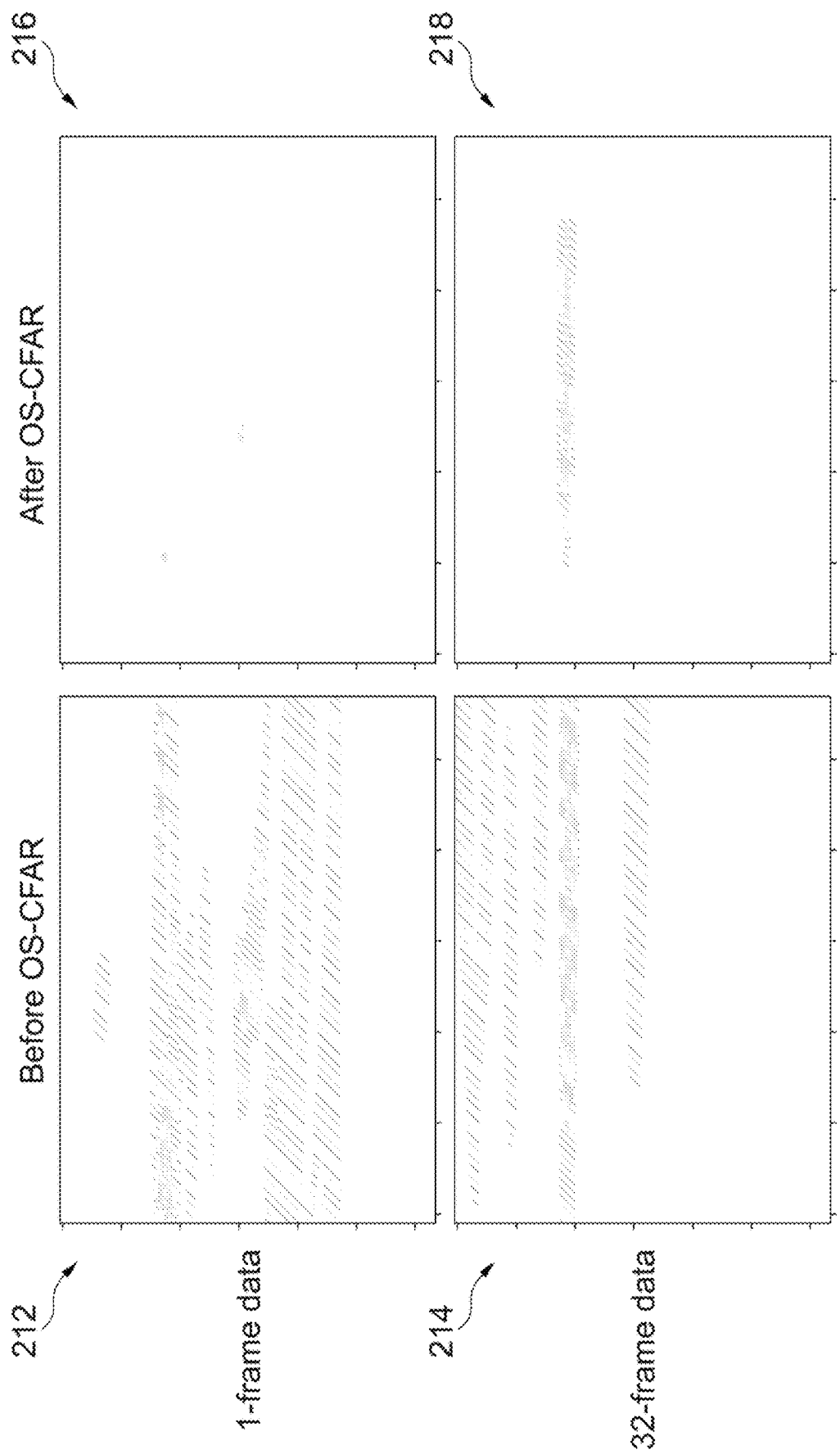
FIG. 2B shows radar images that may be used by the coprocessor of FIG. 2A to update the hyperparameters provided to radar pre-processing module and/or the tracking module of the FIG. 2A, according to an embodiment of the present invention.

FIG. 2B shows radar images, according to an embodiment of the present invention. As shown, radar images 212 and 216 correspond to 1-frame data. Radar images 214 and 218 correspond to 32-frame data. Radar images 212 and 214 correspond to unmasked RAIs. Radar images 216 and 218 correspond to RAIs masked based on an output of an OS-CFAR detector.

In some embodiments, radar-pre-processing 206 provides 1-frame and 32-frame masked and unmasked RAIs to coprocessor 204. Coprocessor 204 then uses such radar images to update the hyperparameters provided to radar pre-processing module 206 and/or tracking module 108. In some embodiments, other combination of radar images may be used. For example, in some embodiments, coprocessor 204 may use only masked radar images to update the provided hyperparameters.

Figure 3A:
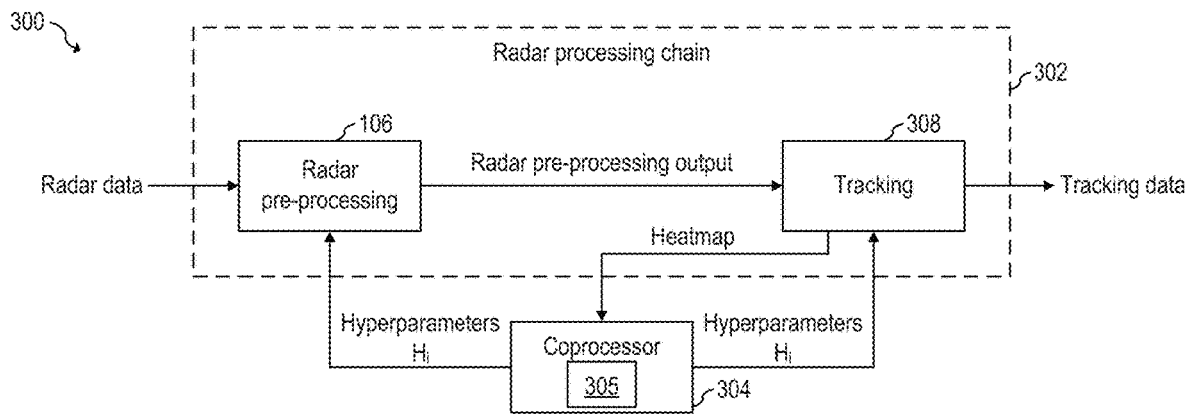
FIG. 3A shows a block diagram of a possible implementation of the radar processing system of FIG. 1, according to an embodiment of the present invention.

FIG. 3A shows a block diagram of radar processing system 300, according to an embodiment of the present invention. Radar processing system 300 includes radar processing chain 302 and coprocessor 304. Radar processing chain 302 includes radar pre-processing module 106 and tracking module 308. Radar processing system 100 may be implemented as radar processing system 300. Radar processing chain 102 may be implemented as radar processing chain 302. Tracking module 108 may be implemented as tracking module 308. Coprocessor 104 may be implemented as coprocessor 304. Hyperparameter selection neural network 105 may be implemented as hyperparameter selection neural network 305.

As shown in FIG. 3A, tracking module 308 generates a heatmap based on the radar pre-processing output (e.g., based on radar image(s), such as shown in FIG. 2B). A heatmap may be understood as an image that includes a prediction, e.g., from tracking module 308 (e.g., location of a target) and its associated uncertainty (e.g., co-variance). Coprocessor 304 provides (e.g., using hyperparameter selection neural network 305) updated hyperparameters to radar pre-processing module 106 and/or to tracking module 308 based on the heatmap generated by tracking module 308.

Figure 3B:
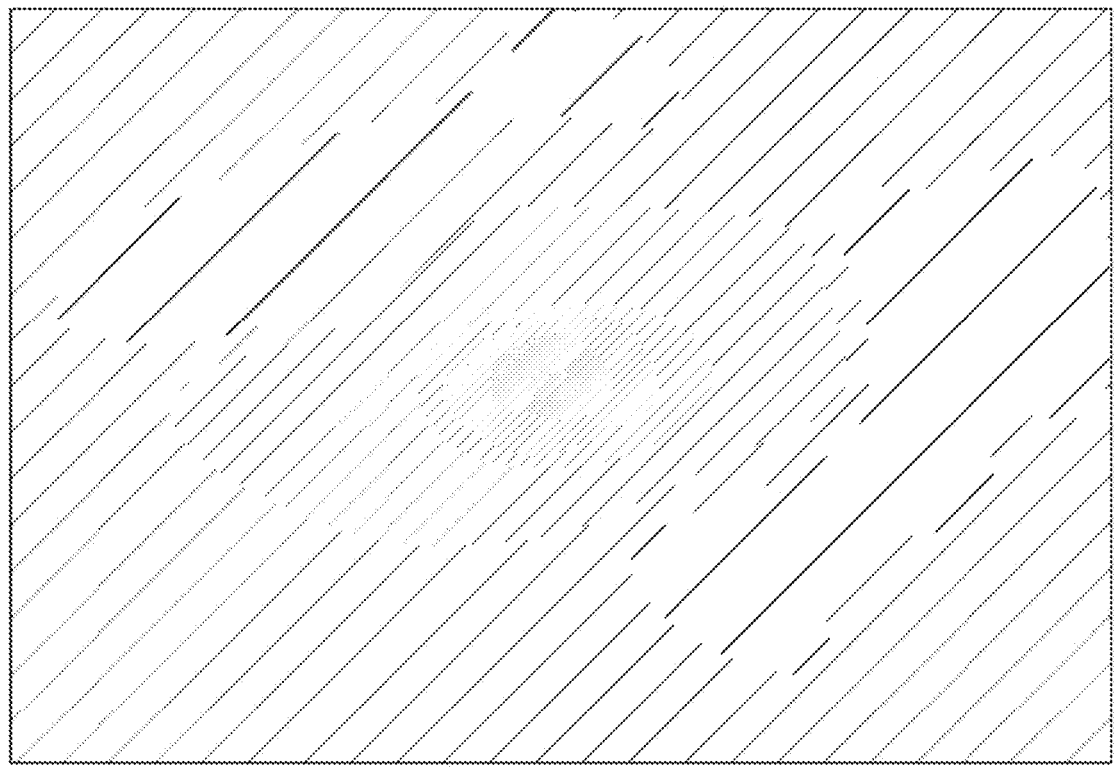
FIG. 3B shows a heatmap, according to an embodiment of the present invention.

FIG. 3B shows heatmap 312, according to an embodiment of the present invention. Heatmap 312 corresponds to a prediction of tracking module 308 based on radar images received from radar pre-processing module 106.

Figure 4:
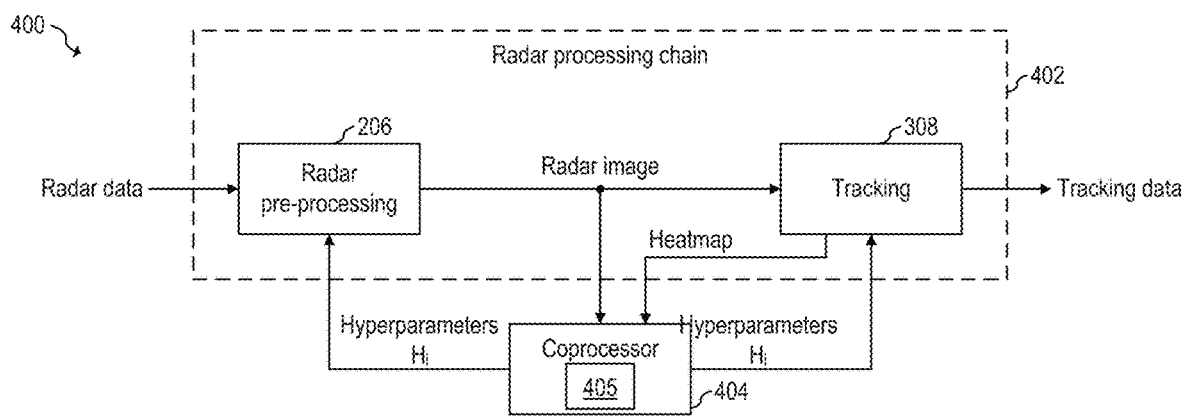
FIG. 4 shows a block diagram of a possible implementation of the radar processing system of FIG. 1, according to an embodiment of the present invention.

In some embodiments, tracking module 308 provides a heatmap (e.g., as shown in FIG. 3B) to coprocessor 304, which in turn uses such heatmap to update the hyperparameters provided to radar pre-processing module 106 and/or tracking module 308. In some embodiments, the coprocessor may receive other combinations of inputs to generate the provided hyperparameters. For example, FIG. 4 shows a block diagram of radar processing system 400, according to an embodiment of the present invention. Radar processing system 400 includes radar processing chain 402 and coprocessor 404. Radar processing chain 402 includes radar pre-processing module 206 and tracking module 308. Radar processing system 100 may be implemented as radar processing system 400. Radar processing chain 102 may be implemented as radar processing chain 402. Coprocessor 104 may be implemented as coprocessor 404. Hyperparameter selection neural network 105 may be implemented as hyperparameter selection neural network 405.

As shown in FIG. 4, coprocessor 404 may provide (e.g., using hyperparameter selection neural network 405) updated hyperparameters to radar pre-processing module 206 and/or tracking module 308 based on output(s) of a radar pre-processing module (e.g., 206), such as radar image(s) (e.g., as shown in FIG. 2B) and based on outputs from a tracking module (e.g., 308), such as a heatmap (e.g., as shown in FIG. 3B).

In some embodiments, the coprocessor (e.g., 104, 204, 304, 404) receives images from a radar pre-processing module (e.g., 106, 206) and/or a tracking module (e.g., 108, 308) having the same size. For example, in some embodiments, images such as 212, 214, 216, 218, and 312 all have the same size, such as 64×64 pixels.

Figure 5:
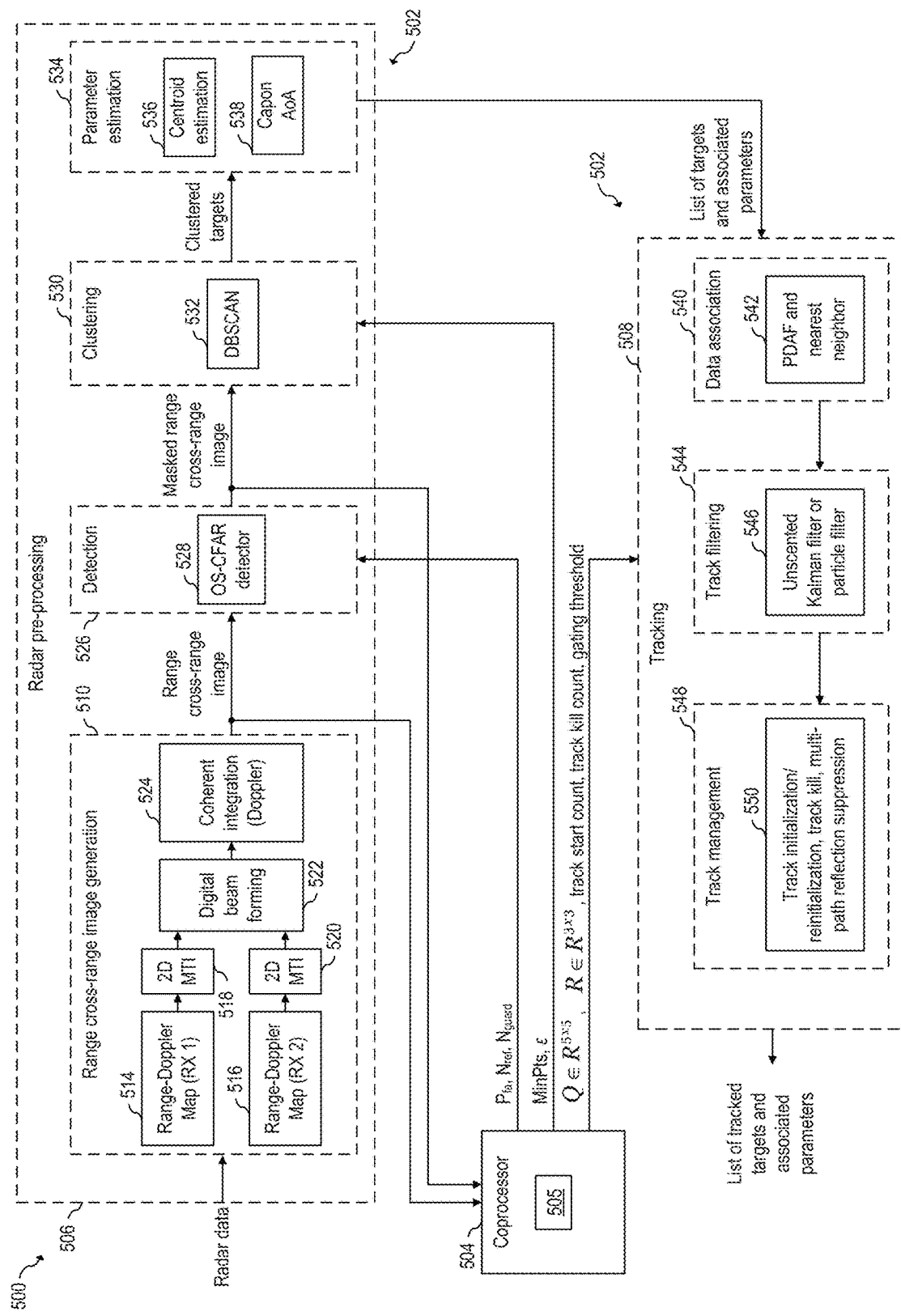
FIGS. 5-8 show possible implementations of the radar processing system of FIG. 2A, according to embodiments of the present invention.

FIG. 5 shows a block diagram of radar processing system 500, according to an embodiment of the present invention.

Radar processing system 500 includes radar processing chain 502 and coprocessor 504. Radar processing chain 502 includes radar pre-processing module 506 and tracking module 508. Radar processing system 100 may be implemented as radar processing system 500. Radar processing chain 102 may be implemented as radar processing chain 502. Coprocessor 104 may be implemented as coprocessor 504. Hyperparameter selection neural networks 105 and 205 may be implemented as hyperparameter selection neural network 505.

As shown in FIG. 5, radar processing system 500 is configured to detect and track human targets. For example, after preforming a range and Doppler FFTs, a RAI (also referred to as a range cross-range image) is generated (510) based on radar data by generating range-Doppler maps (514, 516), applying 2D MTI filtering (518, 520), performing digital beamforming (522), and performing coherent integration (524). Target detection (526) is performed by using an OS-CFAR detector (528). The CFAR detector (528) generates a detection image in which, e.g., "ones" represent targets and "zeros" represent non-targets based, e.g., on the power levels of the range image (e.g., the RAI). The detection image operates as a mask and is multiplied by the RAI to obtain a masked image in which only details of the detected targets are non-zero. The targets present in the masked image are clustered (530) using a density-based spatial clustering of applications with noise (DBSCAN) algorithm (532). After clustering (530), the estimation of parameters (534) for each of the clustered targets, such as the estimation of the centroid of the target (536) and the angle of arrival (538), is performed based on the masked RAI, and the estimated parameters for each detected target is provided to tracking module 508.

As shown in FIG. 5, tracking module 508 associates (540) the detected target to respective tracks using a probabilistic data association filter (PDAF) (542). Track filtering (544) is performed on the tracks using an unscented Kalman filter (546). Tracks are managed (548), e.g., each time step of tracking module 508, and tracks are initialized, killed, reinitialized, and multi-path reflection suppression is performed (550) based on the filtered tracks generated by the unscented Kalman filter (546).

In some embodiments, parameter estimation may be performed by tracking module 508 instead of by radar pre-processing module 506. In some embodiments, other parameters, instead of, or in addition to, the centroid of the target (536) and the angle of arrival (538), may be performed for each target during the parameter estimation step (534).

Performance of radar pre-processing module 506 and tracking module 508 may be affected by hyperparameters such as probability of false alarm ($P_{fa}$), number of reference cells ($N_{ref}$) and number of guard cells ($N_{guard}$), which are used by OS-CFAR detector 528; desired minimum cluster size for determining a cluster (MinPts) and neighborhood (ε), which are used by DBSCAN algorithm (532); and process and measurement covariance matrices Q and R (which are used by the unscented Kalman filter 546), track start count and track kill count (which are used by task management module (548), and gating threshold (which is used by the PDAF algorithm to determine a valid measurement, e.g., when comparing the actual measurement with the predicted measurement when assigning the detected target to the track).

As shown in FIG. 5, coprocessor 504 (e.g., using hyperparameter selection neural network 505) dynamically updates one or more of the hyperparameters provided to radar pre-processing module 506 ($P_{fa}$, $N_{ref}$, $N_{guard}$, MinPts, ε) and/or tracking module 508 (Q, R, track start count, track kill count, gating threshold) based on RAI and/or masked RAI, as generated by modules 510 and 526, respectively. In some embodiments, RAIs and masked RAIs based on the aggregation of images from a plurality of frames may also be used. In some embodiments, coprocessor 504 uses a different combination of radar images, such as using only masked radar images, or only radar images based on aggregation of images from a plurality of frames.

In some embodiments, coprocessor 504 generates updated hyperparameters each frame of range data. In some embodiments, coprocessor 504 generates updated hyperparameters each time step of tracking module 508. Other parameter generation intervals, such as every n frames or every n time steps, where n is greater than 1, may also be used.

Figure 6:
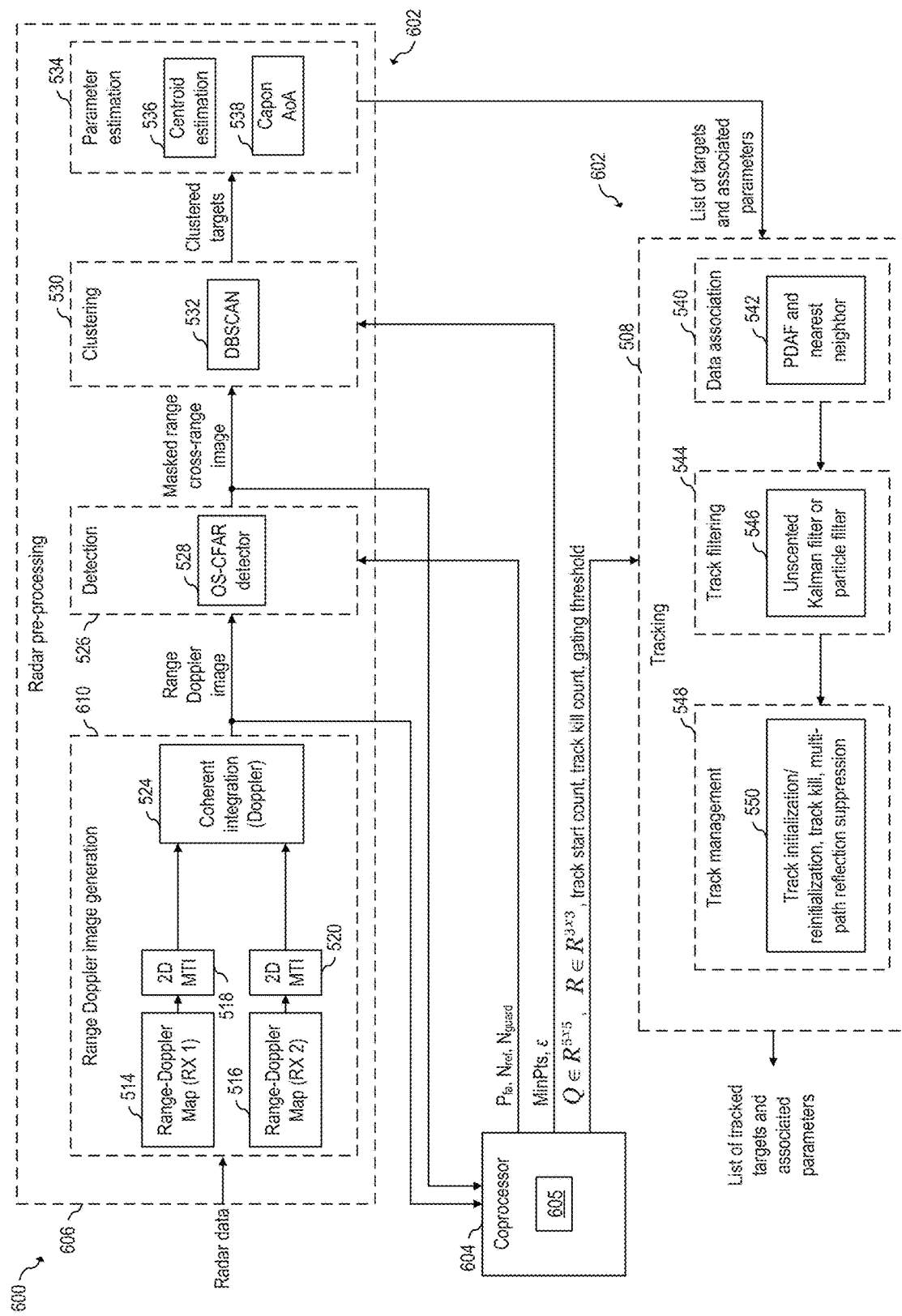

Radar processing system 500 may be modified to operate with other types of radar images. For example, FIG. 6 shows a block diagram of radar processing system 600, according to an embodiment of the present invention. Radar processing system 600 includes radar processing chain 602 and coprocessor 604. Radar processing chain 602 includes radar pre-processing module 606 and tracking module 508. Radar processing system 100 may be implemented as radar processing system 600. Radar processing chain 102 may be implemented as radar processing chain 602. Coprocessor 104 may be implemented as coprocessor 604. Hyperparameter selection neural network 105 and 205 may be implemented as hyperparameter selection neural network 605.

Radar processing system 600 operates in a similar manner as radar processing system 500. Radar processing system 600, however, operates with range Doppler images instead of RAIs.

Figure 7:
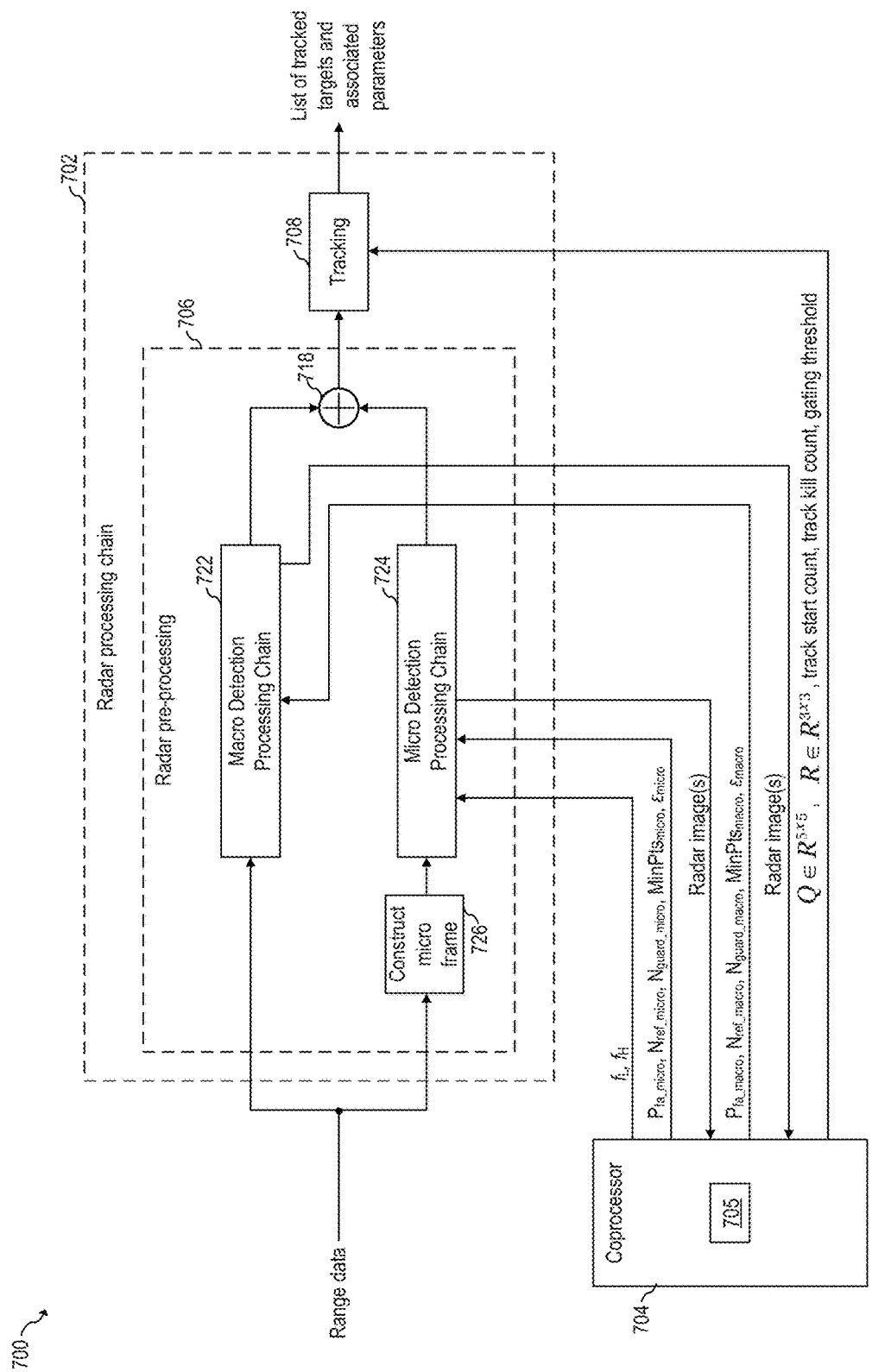

FIG. 7 shows a block diagram of radar processing system 700, according to an embodiment of the present invention. Radar processing system 700 includes radar processing chain 702 and coprocessor 704. Radar processing chain 702 includes radar pre-processing module 706 and tracking module 708. Radar processing system 100 may be implemented as radar processing system 700. Radar processing chain 102 may be implemented as radar processing chain 702. Coprocessor 104 may be implemented as coprocessor 704. Hyperparameter selection neural network 105 and 205 may be implemented as hyperparameter selection neural network 705.

As shown in FIG. 7, radar processing system 700 is configured to detect and track humans targets. Radar pre-processing module 706 is used to detect one or more targets, which are tracked by tracking module 708.

Radar pre-processing module 706 includes macro-Doppler processing chain 724, and a micro-Doppler processing chain 724. In some embodiments, macro-Doppler processing chain 722, and micro-Doppler processing chain 724 may each be implemented in a similar manner as radar pre-processing module 506 or 606, but operating at different frame rates. For example, in some embodiments, macro-Doppler processing chain 722 processes the radar data at a frame rate equal to the frame rate of the radar data, while micro-Doppler detection processing chain 724 processes the radar data at a frame rate lower than the frame rate of the radar data (e.g., every 32 frames of radar data). In some embodiments, the micro frames are constructed (726) by sampling chirps from frames of the range data or from integrating chirps from frames of range data so that the micro frames have a slower frame rate (e.g., 32 times slower than the frames of range data).

Macro-Doppler detection processing chain 722 detects and identifies moving targets and high SNR static targets based on the radar data. For example, in some embodiments, macro detection processing chain 722 produces an output that includes a set of target parameters associated with the respective detected targets, where each target parameter includes data associated with range, Doppler velocity, and angle of the respective target.

In some embodiments, after MTI filtering in macro detection processing chain 722, only targets with high motion are retained as their energy is varying across Doppler images. Thus, in some embodiments, the set of target parameters do not include target parameters associated with low motion, such as walls, since such targets may be removed, e.g., by MTI filtering, performed by macro detection processing chain 722 (e.g., since, even though a wall may be considered a high SNR object, fluctuations in the motion of a wall, if any, are too low to cause the retention of the wall as a target after MTI filtering).

Micro detection processing chain 724 detects and identifies static targets based on the radar data. For example, in some embodiments, micro detection processing chain 724 produces an output that includes a set of target parameters associated with the respective detected targets, where each target parameter includes data associated with range and angle of the respective target. In some embodiments, the target parameters generated by micro detection processing chain 724 do not include Doppler velocity, as it may be assumed to be 0 m/s (since the targets detected by micro detection processing chain 724 are static targets). In some embodiments, micro-Doppler processing chain 724 includes a micro-Doppler filter that filters the range FFTs with a pass-band corresponding to human vital signs (e.g., between 0.5 Hz and 5 Hz) before generating the range-Doppler maps (514,516).

The target(s) detected by detection processing chains 722 and 724 are combined (718) and then tracked by a single tracker 708. In some embodiments, tracking module 708 may be implemented as an interactive multiple model (IMM) tracker. Other trackers may also be used.

As shown in FIG. 7, coprocessor 704 receives (e.g., using hyperparameter selection neural network 705) radar images (e.g., RAI and/or RDI before or after OS-CFAR) from detection processing chains 722 and 724 and updates one or more hyperparameters based on the received radar images. In some embodiments, the hyperparameters provided by coprocessor 704 to macro-Doppler processing chain 722 include probability of false alarm ($P_{fa\_macro}$), number of reference cells ($N_{ref\_macro}$), and number of guard cells ($N_{guard\_macro}$), which are used by the OS-CFAR detector; and desired minimum cluster size ($MinPts_{macro}$) and neighborhood ($\varepsilon_{macro}$), which are used by DBSCAN algorithm. In some embodiments, the hyperparameters provided by coprocessor 704 to micro-Doppler processing chain 724 include probability of false alarm ($P_{fa\_micro}$), number of reference cells ($N_{ref\_micro}$), and number of guard cells ($N_{guard\_micro}$), which are used by the OS-CFAR detector; desired minimum cluster size ($MinPts_{micro}$) and neighborhood ($\varepsilon_{micro}$), which are used by DBSCAN algorithm; and $f_L$ (lower cut-off frequency) and $f_H$ (higher cut-off frequency), which are used to configure the bandwidth of the micro-Doppler filter.

In some embodiments, the hyperparameters provided by coprocessor 704 to tracking module 708 include process and measurement covariance matrices Q and R, track start count and track kill count, and gating threshold.

Figure 8:
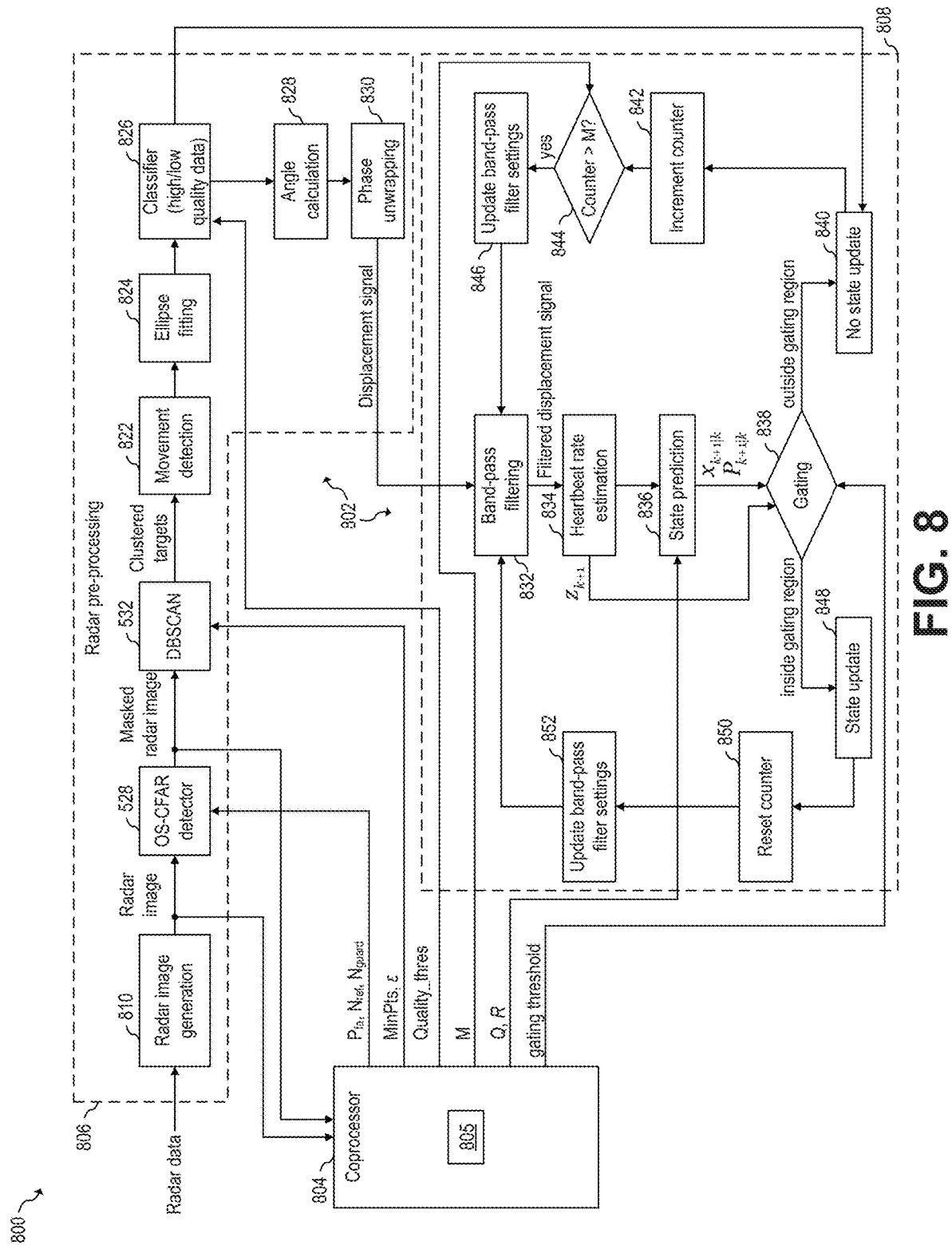

FIG. 8 shows a block diagram of radar processing system 800, according to an embodiment of the present invention. Radar processing system 800 includes radar processing chain 802 and coprocessor 804. Radar processing chain 802 includes radar pre-processing module 806 and tracking module 808. Radar processing system 100 may be implemented as radar processing system 800. Radar processing chain 102 may be implemented as radar processing chain 802. Coprocessor 104 may be implemented as coprocessor 804. Hyperparameter selection neural network 105 and 205 may be implemented as hyperparameter selection neural network 805.

As shown in FIG. 8, radar processing system 800 is configured to detect and track a heartbeat rate of a human target. Radar pre-processing module 806 is used to generate a displacement signal of a detected human target. The displacement signal is further processed by tracking module 708, which uses Kalman filter to track the heartbeat rate of the human based on the processed displacement signal.

Radar pre-processing module 806 includes radar image generation 810, which generates a radar image (e.g., RDI, RAI) based on the radar data. After target detection (528) and target clustering (532), target movement detection is performed (822), e.g., based on the standard deviation on the complex range data at the detected target range. For non-moving targets, an ellipse fitting algorithm (824) is applied to the I-Q trace (of the complex range data) associated with the detected target to compensate for offset, amplitude, and gain errors. The compensated data (the compensated I-Q signals) are provided to a classifier (826), which estimates the quality of the compensated data and classifies the compensated data as "high quality" or "low quality" based on the random body movements (RBM) and/or intermodulation product (IMP) exhibited by the compensated data. The angle of the compensated target data is calculated (828) (e.g., by arctangent demodulation of the I-Q signals from the selected range bin) and the resulting phase values are unwrapped (830) between two consecutive data points for "high quality" compensated data to generate a displacement signal.

Tracking module 808 receives the displacement signal and filters it using band-pass (e.g., FIR) filter 832. The heartbeat rate $z_{k+1}$ is estimated (834) based on the filtered displacement signal, where k+1 is indicative of the next time step of the Kalman filter.

Kalman filtering may be understood as a recursive Bayesian process, which may be applied when the measured values contain unpredictable or random errors, uncertainties or variations. With respect to FIG. 8, the process of Kalman filtering includes steps 836, 838, 840, and 848.

For each time step k, the Kalman filter makes a state prediction (836) based on the track associated with the heartbeat rate of the human target. An ellipsoidal gating function checks (838) whether the estimated heartbeat rate $z_{k+1}$ is within a gating window. When the heartbeat rate estimate $z_{k+1}$ is inside the gating region (e.g., when the gating function is lower than a gating threshold), the state of the Kalman filter is updated (848) based on the first rate $z_{k+1}$ and the band-pass filter settings are updated (852) (e.g., by narrowing the pass-band) based on the updated state. When the heartbeat rate estimate $z_{k+1}$ is outside the gating region (e.g., when the gating function is higher than a gating threshold), the state of the Kalman filter is not updated (840). If the state of the Kalman filter is not updated for M consecutive cycles, the band-pass filter settings are updated (846) (e.g., by increasing the pass-band).

As shown in FIG. 8, coprocessor 804 receives (e.g., using hyperparameter selection neural network 805) radar images (e.g., RAI and/or RDI before or after OS-CFAR) from radar pre-processing module 806 and updates one or more hyperparameters based on the received radar images. In some embodiments, the hyperparameters provided by coprocessor 804 to m radar pre-processing module 806 include probability of false alarm ($P_{fa}$), number of reference cells ($N_{ref}$), and number of guard cells ($N_{guard}$), which are used by the OS-CFAR detector (528); desired minimum cluster size (MinPts) and neighborhood (ε), which are used by DBSCAN algorithm; and Quality_thres, which is used by classifier 826 to discriminate between high quality data and low quality data. In some embodiments, the hyperparameters provided by coprocessor 804 to tracking module 808 include process and measurement covariance matrices Q and R, threshold M, and gating threshold.

In some embodiments, radar image generation module 810 may be implemented as modules 510 or 610, for example.

In some embodiments, the hyperparameter selection neural network (e.g., 105, 205, 305, 405, 505, 605, 705, 805) may be implemented with an input layer (e.g., 32×29×16), followed by three convolutional layers, followed by three dense layers. Other implementations, such as including one or more fully connected layers, are also possible.

In some embodiments, the hyperparameter selection neural network (e.g., 105, 205, 305, 405, 505, 605, 705, 805) may be trained using one of or a combination of imitation learning, reinforcement learning, and cumulative learning. Other training methods may also be used.

Advantages of some embodiments include the capability of dynamically adapting one or more hyperparameters of the radar processing chain to optimize the radar performance, e.g., on a scene by scene basis. Adapting the hyperparameters of the radar processing chain based on the scene may advantageously result in better radar performance, e.g., when compared with radar processing chains that operate with fixed hyperparameters.

Figure 9A:
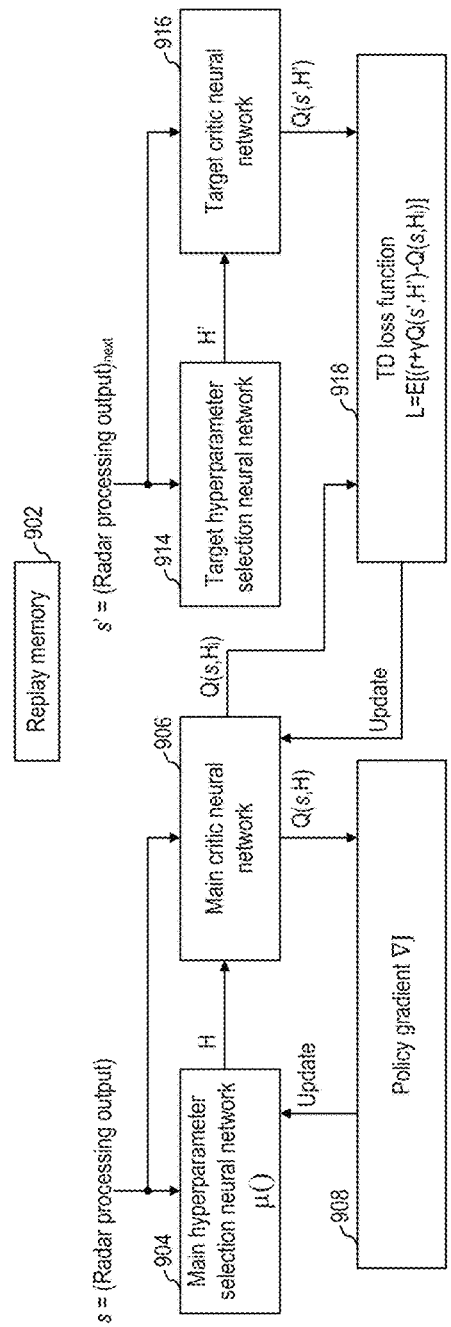
FIGS. 9A and 9B show a block diagram and a flow chart, respectively, illustrating an embodiment method for training a hyperparameter selection neural network, according to an embodiment of the present invention.

FIG. 9A shows a block diagram illustrating embodiment method 900 for training a hyperparameter selection neural network (e.g., 105, 205, 305, 405, 505, 605, 705, 805), according to an embodiment of the present invention. As shown in FIG. 9A, method 900 may be implemented using reinforcement learning.

During training, main hyperparameter selection neural network 904 generates a set H of probability distributions of hyperparameters based on the current radar processing output s (e.g., received from a radar processing chain, such as 102, 202, 302, 402, 502, 602, 702, 802) according to the current policy μ( ) of the main hyperparameter selection neural network 904.

Main critic neural network 906 generates a Q-value Q(s,H) based on the current radar processing output s and the set of hyperparameters H generated by main hyperparameter selection neural network 904, where the Q-value Q(s,H) is indicative of how good the set H is with respect to the current radar processing output s.

A policy gradient algorithm 908 is used based on the Q-value Q(s,H) to find the direction and magnitude of change of the coefficients of main hyperparameter selection neural network 904. The coefficients of main hyperparameter selection neural network 904 are updated based on the gradient ∇J determined by the policy gradient algorithm 908.

In some embodiments, the policy gradient algorithm 908 may be implemented in any way known in the art.

Main critic neural network 906 may be updated based on a Q-value generated based on the next radar processing output s'. For example, in some embodiments, Q(s,H) generated by main critic neural network 906 may be given by $$Q(s,H)=E[r+\gamma E[Q(s',H')]] \quad (1)$$

where E[ ] represents the expected value function, r represents the reward, γ represents a discount factor (which may be between 0 and 1), and Q-value Q(s',H') is the Q-value based on the next radar processing output s'. However, the estimated value E[Q(s',H')] used in Equation 1 is based on an estimate generated by man critic neural network 906.

Target critic neural network 916 may generate Q(s',H') based on the set H' of probability distribution of hyperparameters generated by target hyperparameter selection neural network 914 based on the next radar processing output s'. The coefficient of main critic neural network 906 may be updated based on a temporal difference (TD) loss function (918), which may be given by $$L=E[r+\gamma Q(s',H')-Q(s,H_i)] \quad (2)$$

where $H_i$ is a set of specific hyperparameters that corresponds to, e.g., optimal specific hyperparameters selected from the probability distributions of the hyperparameters of set H. In some embodiments, each of the hyperparameters of the set of hyperparameters $H_i$ corresponds to the peak value of their respective probability distributions.

In some embodiments, the main neural networks (904 and 906) are updated during each training batch while the target networks (914 and 916) are updated every m updates of the main networks 904 and 906 (e.g., by copying the coefficients from networks 904 and 906 to 914 and 916, respectively). In some embodiments, m is 1000. Other values, such as lower than 1000 (e.g., 900, or less), or higher than 1000, such as (2000), or more), may also be used.

In some embodiments, each of the neural networks 904, 906, 914, and 914 may be implemented with an input layer (e.g., 32×29×16), followed by three convolutional layers, followed by three dense layers. Other implementations, such as including one or more fully connected layers, are also possible.

Figure 9B:
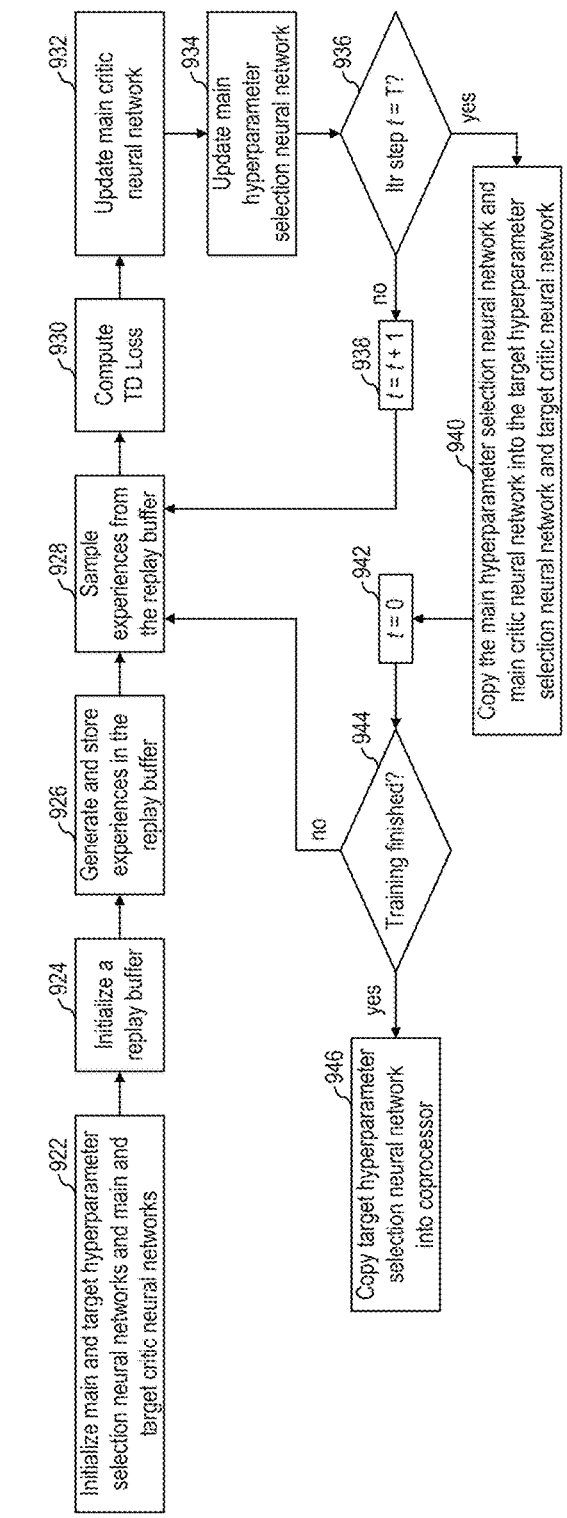

FIG. 9B shows a flow chart of embodiment method 900 for training a hyperparameter selection neural network, according to an embodiment of the present invention. FIG. 9B may be understood in view of FIG. 9A.

During step 922, the main neural networks (904 and 906) and the target neural networks (914 and 916) are initialized. For example, in some embodiments, main and target hyperparameter selection neural networks 904 and 914 are initialized as identical networks, and main and target critic neural networks 906 and 916 are initialized as identical networks. In some embodiments, neural networks 904, 906, 914 and 916 are initialized randomly. In some embodiments, main and target hyperparameter selection neural networks 904 and 914 may be initialized with pre-trained hyperparameter selection neural networks (e.g., trained using imitation learning). Some embodiments may initialize the main and target hyperparameter selection neural networks and/or the main and target critic networks in other ways.

During step 924, replay memory 902 is initialized. In some embodiments, replay memory 902 is configured to store experiences e, where each experience e includes current and next radar processing output s and s', the set H of hyperparameters generated by main hyperparameter selection neural network 904 based on s, and the reward value r.

During step 926, experiences are generated by neural networks 904, 906, 914, and 916, and the results are stored in replay memory 902. For example, in some embodiments, radar data, e.g., received from a millimeter-wave radar, is processed using a radar processing chain (e.g., 102, 202, 302, 402, 502, 602, 702, 802) to generate radar processing outputs. The outputs generated by the radar processing chain are fed to the main and target neural networks (904, 906, 914, and 916), and outputs from the neural networks (904, 906, 914, and 916), together with other associated data (e.g., r) are stored in the replay buffer.

During step 928, experiences from replay buffer are (e.g., randomly) sampled. The sampled experiences are used to compute TD loss L (918) using, e.g., Equation 2, during step 930.

During step 932, main critic neural network 906 is updated based on the gradient of the TD loss L. In some embodiments, updating the main critic neural network 906 advantageously allows for causing main critic neural network 906 to better predict the effect of the set of hyperparameters H on the radar the radar processing output s.

During step 934, main hyperparameter selection neural network 904 is updated using a policy gradient algorithm (908).

As shown by steps 936 and 938, in some embodiments, steps 928, 930, 932, and 934 are repeated T times, where T is larger than 1, such as 100, 1000, or more. As shown by steps 940 and 942, the main neural networks (904, 906) are copied to the respective target networks (914, 916) every T iteration steps. Thus, in some embodiments, the target neural networks (914, 916) are updated every T updates of the main neural networks (904, 906).

As shown by steps 944 and 946, when the training finishes, target hyperparameter selection neural network 914 is copied into a coprocessor (e.g., to become hyperparameter selection neural network 105, 205, 305, 405, 505, 605, 705, 805) to be used in inference mode. In some embodiments, the copied hyperparameter selection neural network deactivates the feature of outputting the set H of probability distribution of hyperparameters and instead provides the set $H_i$ of specific hyperparameters. Thus, during inference mode, the hyperparameter selection neural network (e.g., 105, 205, 305, 405, 505, 605, 705, 805) outputs a set $H_i$ of specific hyperparameters based on the radar processing input (s) received by the radar processing chain (e.g., 102, 202, 302, 402, 502, 602, 702, 802).

In some embodiments, the reward r, e.g., used to compute the TD loss function (918), e.g., using Equation 2, may be given by $$r = \frac{-\sum_{i=0}^{T_N} errDist_i + errDet \cdot factorVal}{T_N + 1} \quad (3)$$

where $T_N$ represents the number of targets present in the radar processing data s, $errDist_i$ represents the distance between a prediction of the tracker (e.g., 108, 208, 308, 408, 508, 608, 708, 808) and the closest detected target, factorVal represents a factor, which may be a real number, such as between 1 and 5, such as 2, and errDet is indicative of target detection errors, and may be given by $$errDet=misDets+falseAlarms \quad (4)$$

where misDets represents the number of misdetections (e.g., targets that are present in radar processing output s but that are not detected by the tracker (e.g., 108, 208, 308, 408, 508, 608, 708, 808)), and falseAlarms represents the number of false alarms (e.g., targets that are not present in radar processing output s but that are detected by the tracker (e.g., 108, 208, 308, 408, 508, 608, 708, 808)).

In some embodiments, other reward r formulations may be used. For example, in some embodiments, the reward r may be given by $$r = \frac{-\sum_{i=0}^{T_N} errDist_i + errDet \cdot factorVal}{T_N + 1} + \max\left(\log\left(\frac{maxCondPPred}{1000}\right), 0\right) \quad (5)$$

where maxCondPPres represents the highest condition number in the matrix of prediction of the tracker. When applying Equation 5, the reward r is maximized when the condition number is lower than a threshold (set to 1000 in Equation 5).

In some embodiments, the distance $errDist_i$ is the Euclidean distance between the prediction of the tracker and the closest detected target. In some embodiments, using a Mahalanobis distance may advantageously take into account the distribution of the prediction of the tracker, which may advantageously provide a better distance metric than Euclidean distance. Other distance functions, such as the Mahalanobis distance, may be used.

In some embodiments, the distance $errDist_i$ is based on labels associated with the radar processing output s. For example, in some embodiments, the distance $errDist_i$ is the distance (e.g., Euclidean, Mahalanobis) between the tracker prediction and the location of target according to label data.

In some embodiments, the label data is generated by capturing frames with a radar sensor of a scene and, simultaneously, capturing data, e.g., with a video camera and/or other sensors, of the same scene. Other methods for generating the labeled data may also be used.

In some embodiments, the Q-value function Q(s,H) generated by a critic neural network (e.g., 906, 916) may be given by $$Q(s,H|\theta^Q) = A(s,H|\theta^A) + V(s|\theta^V) \quad (6)$$

where V( ) represents a value function indicative of a value of radar processing output s, A( ) represents an advantage function indicative of the relative quality of H relative to the average quality of possible hyperparameters that can be selected, and $\theta^Q$, $\theta^A$, and $\theta^V$ parametrizes functions Q( ), A( ), and V( ), respectively, so that $\theta^Q = \theta^A \cup \theta^V$.

In some embodiments, the advantage function may be given by $$A(s,H|\theta^A) = -\frac{1}{2}(u-\mu(s|\theta^\mu))^T P(s|\theta^P)(u-\mu(s|\theta^\mu)) \quad (7)$$

where μ( ) represents the policy of hyperparameter selection neural network 904, and u is a hyperparameter exploration function that may be given by $$u = \mu(s|\theta^\mu) + N \quad (8)$$

where N represents exploration noise, and $P(s|\theta^P)$ is a state dependent square matrix that may be given by $$P(s|\theta^P) = L(s|\theta^L) L(s|\theta^L)^T \quad (9)$$

where $L(s|\theta^L)$ is a lower triangular matrix, where $\theta^\mu$ represents the parameters of the hyperparameter selection neural network 904, where $\theta^L$ represents the parameters of a lower triangular neural network producing the values of the lower triangular matrix $L(s|\theta^L)$, and where $\theta^P = \theta^L \cup \theta^{LT}$.

Figure 9C:
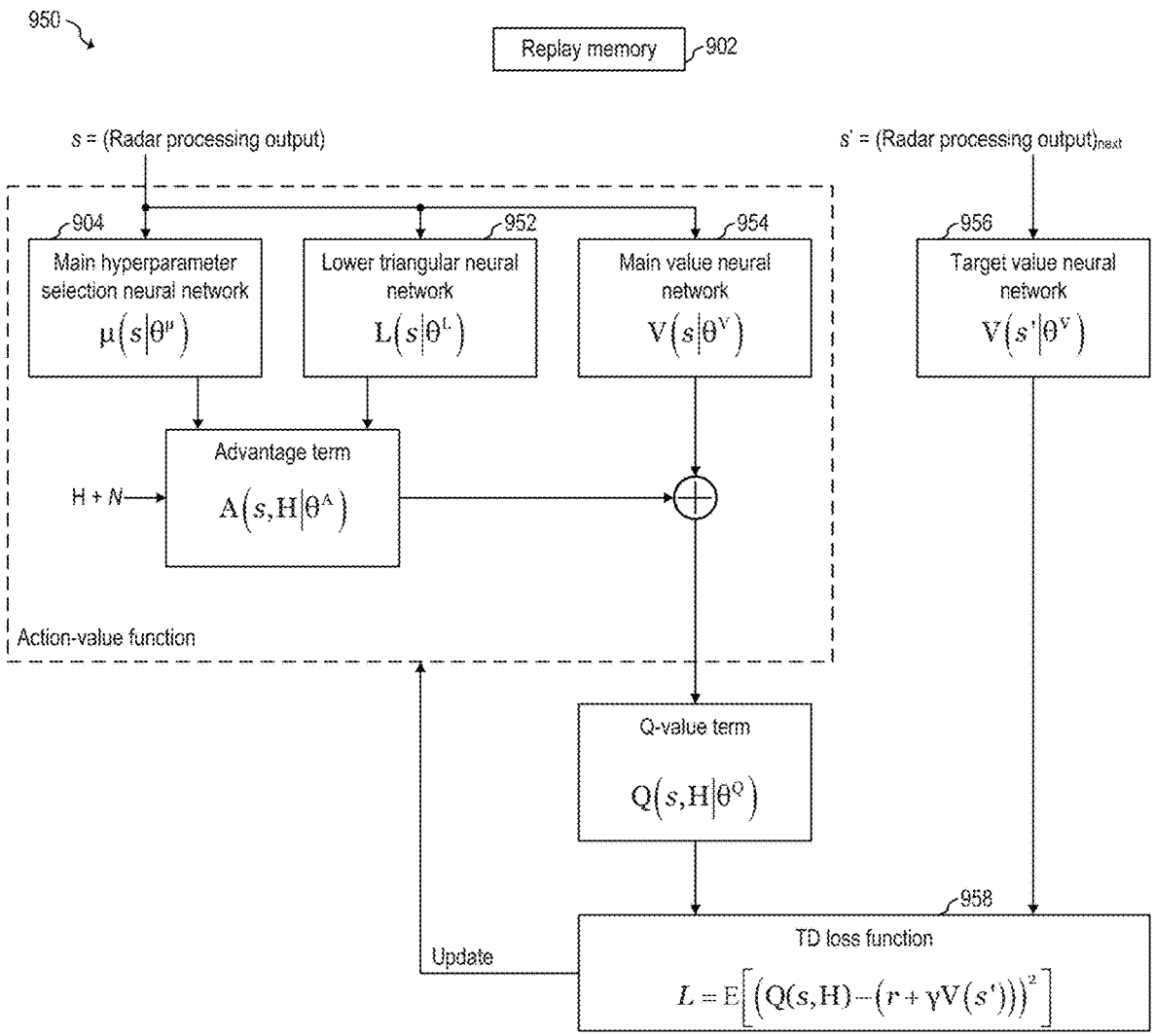
FIG. 9C shows a block diagram illustrating an embodiment method for training a hyperparameter selection neural network, according to an embodiment of the present invention.

FIG. 9C shows a block diagram illustrating embodiment method 950 for training a hyperparameter selection neural network (e.g., 105, 205, 305, 405, 505, 605, 705, 805), according to an embodiment of the present invention. FIG. 9C may be understood in view of Equations 6-9.

As shown in FIG. 9C, main hyperparameter selection neural network 904 implements the policy function μ( ) (which is used to generate the set H of hyperparameters), lower triangular neural network 952 provides the elements of the lower triangular function matrix $L(s|\theta^L)$, and value neural networks 954 and 956 implement a value function $V(s|\theta^V)$. Neural networks 952, 954, and 956 may be referred to as critic neural networks.

As shown in FIG. 9C, during training, the Q-value term is generated based on Equations 6-9 using main hyperparameter selection neural network 904, lower triangular neural network 952, and main value neural network 954. Target value neural network 956 implements the value function V( ) and operates based on the next radar processing output s'.

In some embodiments, the coefficient of main hyperparameter selection neural network 904, lower triangular neural network 952, and main value neural network 954, may be updated based on a gradient of TD loss function (958), which may be given by $$L = E[(Q(s,H) - (r + \gamma V(s')))^2] \quad (10)$$

where the gradient of the TD loss function of Equation 10 may be calculated by $$\nabla L = \nabla E[(Q(s,H) - (r + \gamma V(s')))^2] = E[2(Q(s,H) - (r + \gamma V(s'))) \nabla Q(s,H)] \quad (11).$$

In some embodiments, target value neural network 956 is updated in a time delayed manner by copying the coefficients from main value neural network 954.

In some embodiments, the neural networks 904, 952, and 954 are updated during each training batch while neural network 956 is updated every m updates of the neural networks 904, 952, and 954.

In some embodiments, each of the neural networks 904, 952, 954, and 956 may be implemented with an input layer (e.g., 32×29×16), followed by three convolutional layers, followed by three dense layers. Other implementations, such as including one or more fully connected layers, are also possible.

In some embodiments, methods 900 and 950 may be implemented using curriculum learning. For example, in some embodiments, the radar processing outputs s provided to the neural networks (e.g., 904, 906, 914, and 916; or 904, 952, and 956) are provided in a sequence of increasing complexity. For example, in some embodiments implementing method 900, the first iterations of the loop including steps 928, 930, 932, 934, 936, 938, 940, and 942 include only radar processing outputs s corresponding to 0 targets; the next iterations of the loop may include only radar processing outputs s corresponding to 0 and 1 targets; the following iterations of the loop may include only radar processing outputs s corresponding to 0, 1, and 2 targets; etc. Similarly, in some embodiments, implementing method 950, the mini-batches of lower complexity (e.g., with radar processing outputs s corresponding to 0 targets) are fed first during training, followed by mini-batches of increasing complexity (e.g., 0 and 1 targets; 0, 1, and 2 targets; etc.).

In some embodiments, complexity may be increased in other ways, such as by increasing clutter in the environment, increasing the size of the field-of-view, etc.

By using curriculum learning, some embodiments advantageously achieved faster learning time/convergence compared to presenting the radar processing outputs in a random manner.

Figure 10:
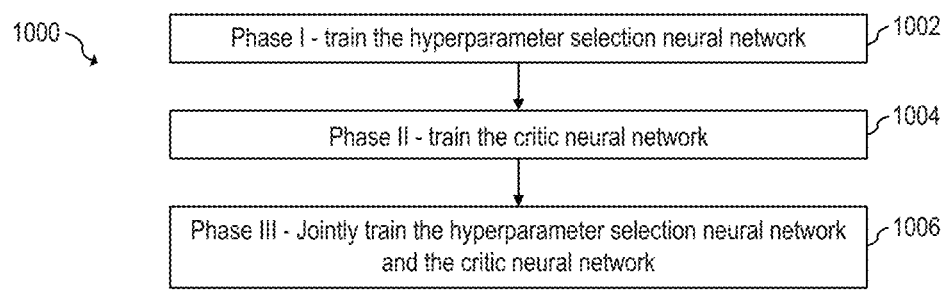
FIG. 10 shows a flow chart of embodiment an method for training a hyperparameter selection neural network, according to an embodiment of the present invention.

In some embodiments, the hyperparameter selection neural network (e.g., 105, 205, 305, 405, 505, 605, 705, 805) is trained in multiple phases. For example, FIG. 10 shows a flow chart of embodiment method 1000 for training a hyperparameter selection neural network, according to an embodiment of the present invention.

During phase I (1002), the hyperparameter selection neural network (e.g., 904) is trained. For example, in some embodiments, the hyperparameter selection neural network is trained using imitation learning. For example, in some embodiments, manually selected hyperparameters are paired with radar processing outputs s. A loss function may be defined as the difference between the manually selected hyperparameters and the hyperparameters produced by hyperparameter selection neural network 904. The coefficients of the hyperparameter selection neural network are iteratively adjusted based on the loss function (e.g., to minimize the difference between the manually selected hyperparameters and the hyperparameters produced by hyperparameter selection neural network 904).

In some embodiments, using imitation learning before performing phase II (1004) and phase III (1006) training advantageously a hyperparameter neural network that provides a good initial set H of hyperparameters, which may result in faster training/convergence time.

Once the hyperparameter selection neural network is trained during phase I (1002), the critic neural network is trained during phase II (1004). For example, in some embodiments implementing method 900, during phase II (1004), the hyperparameter selection neural networks 904 and 914 are fixed (e.g., equal to the trained hyperparameter selection neural network after phase I), and the critic neural networks (906 and 916) are trained. For example, in some embodiments, method 900 is performed to train the critic neural networks (906 and 916) while keeping constant the hyperparameter selection neural networks (e.g., during steps 934 and 940). As another example, in some embodiments implementing method 950, during phase II (1004), the hyperparameter selection neural networks 904 is fixed (e.g., equal to the trained hyperparameter selection neural network after phase I), and neural networks 952, 954, and 956, are trained.

Once the hyperparameter selection neural network and the critic neural network are trained during phases I (1002) and II (1004), respectively, the hyperparameter selection neural network and the critic neural network are jointly trained during phase III (1006). For example, in some embodiments, the hyperparameter selection neural network and the critic neural network are jointly trained during phase III (1006) by performing method 900 or 950. In some embodiments, method 900 or 950 may be performed using curriculum learning (e.g., by increasing the complexity of the radar processing outputs as the training progresses).

In some embodiments, one or more training phases may be omitted. For example, in some embodiments, phase III (1006) may be omitted. In some embodiments, phases I (1002) may be omitted. In some embodiments, phases I (1002) and II (1004) may be omitted. Other implementations are also possible.

Figure 11A:
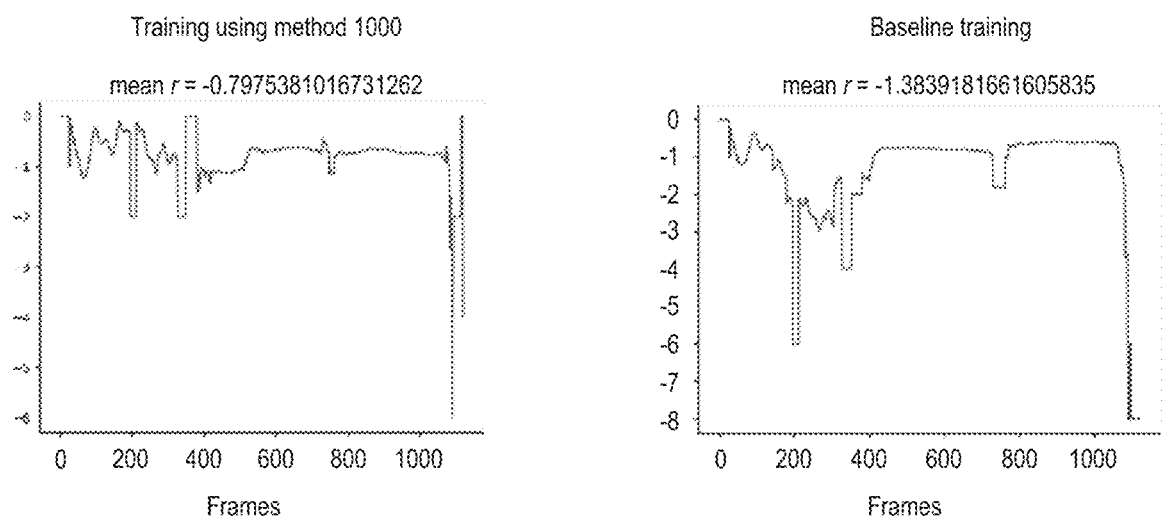
FIGS. 11A and 11B illustrate a comparison between training a hyperparameter selection neural network using the method of FIG. 10 versus a baseline method, according to an embodiment of the present invention.
Figure 11B:
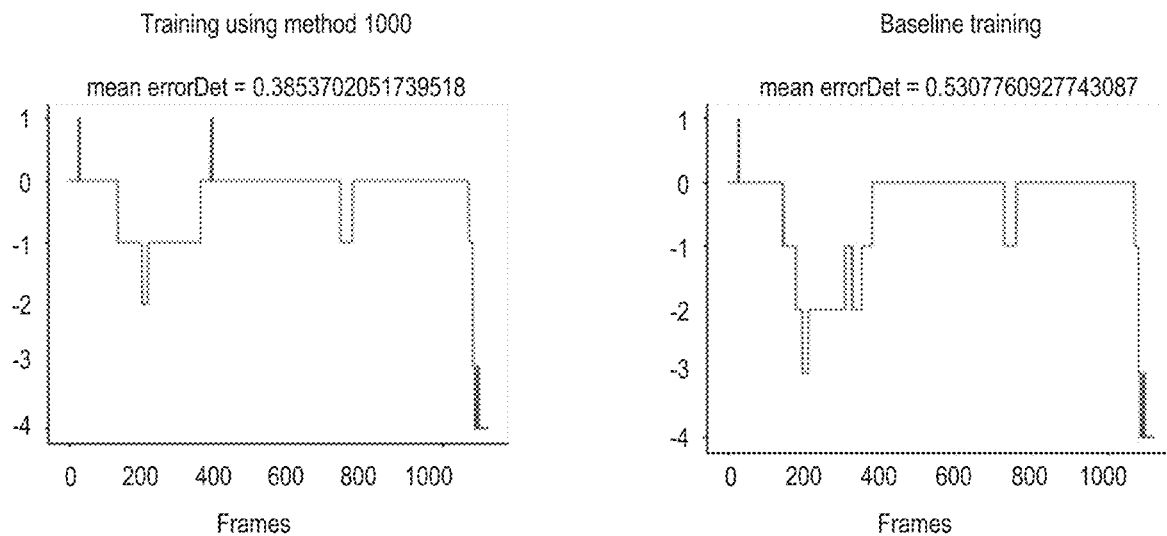

FIGS. 11A and 11B illustrate a comparison between a scene-based radar (as implemented as shown in FIG. 8) versus a baseline radar, according to an embodiment of the present invention. The scene-based radar includes a radar processing chain and a hyperparameter selection neural network trained using method 1000 to dynamically provide hyperparameters to the radar processing chain. The baseline radar operates with fixed hyperparameters.

As shown in FIGS. 11A and 11B, in some embodiments, dynamically adjusting the hyperparameters of the radar processing chain advantageously results in superior radar performance when compared to using fixed hyperparameters, as indicated by the higher average reward r (which is used here as a metric to evaluate performance) and lower errorDet exhibited by the scene-based radar, as compared to the baseline radar.

Figure 12:
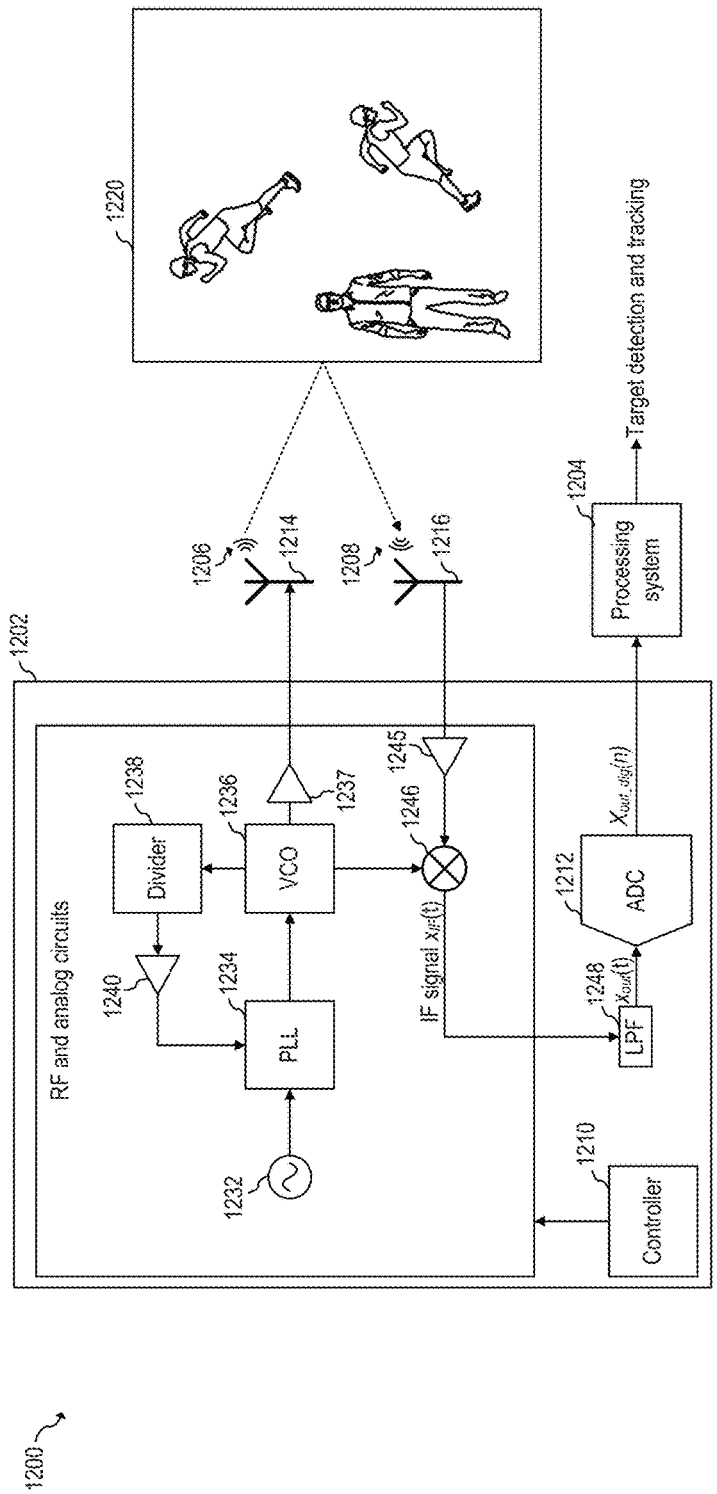
FIG. 12 shows a schematic diagram of a millimeter-wave radar system, according to an embodiment of the present invention.

FIG. 12 shows a schematic diagram of millimeter-wave radar system 1200, according to an embodiment of the present invention. Millimeter-wave radar system 1200 includes millimeter-wave radar sensor 1202 and processing system 1204. In some embodiments, millimeter-wave radar sensor 1202 may be used to generate radar data ($x_{out\_dig}(n)$) and processing system 1204 may implement a radar processing chain (e.g., 102, 202, 302, 402, 502, 602, 702, 802) and a coprocessor (e.g., 104, 204, 304, 404, 504, 604, 704, 804).

During normal operation, millimeter-wave radar sensor 1202 operates as a frequency-modulated continuous-wave (FMCW) radar sensor and transmits a plurality of TX radar signals 1206, such as chirps, towards scene 1220 using one or more transmitter (TX) antenna 1214. The radar signals 1206 are generated using RF and analog circuits 1230. The radar signals 1206 may be, e.g., in the 20 GHz to 122 GHz range. Other frequencies may also be used.

The objects in scene 1220 may include one or more static or moving objects, such as cars, motorcycles, bicycles, trucks, and other vehicles, idle and moving humans and animals, furniture, machinery, mechanical structures, walls and other types of structures. Other objects may also be present in scene 1220.

The radar signals 1206 are reflected by objects in scene 920. The reflected radar signals 1208, which are also referred to as the echo signal, are received by one or more receiving (RX) antennas 916. RF and analog circuits 1230 processes the received reflected radar signals 1208 using, e.g., band-pass filters (BPFs), low-pass filters (LPFs), mixers, low-noise amplifier (LNA), and/or intermediate frequency (IF) amplifiers in ways known in the art to generate an analog signal $x_{out}(t)$.

The analog signal $x_{out}(t)$ is converted to raw digital data $x_{out\_dig}(n)$ (also referred to as radar data) using ADC 1212. The raw digital data $x_{out\_dig}(n)$ is processed by processing system 1204 to, e.g., detect and track targets. In some embodiments, processing system 1204 may be used to identify and classify targets.

Controller 1210 controls one or more circuits of millimeter-wave radar sensor 1202, such as RF and analog circuit 1230 and/or ADC 1212. Controller 1210 may be implemented, e.g., as a custom digital or mixed signal circuit, for example. Controller 1210 may also be implemented in other ways, such as using a general purpose processor or controller, for example. In some embodiments, processing system 104 implements a portion or all of controller 1210.

Processing system 1204 may be implemented with a general purpose processor, controller or digital signal processor (DSP) that includes, for example, combinatorial circuits coupled to a memory. In some embodiments, processing system 1204 may be implemented as an application specific integrated circuit (ASIC). In some embodiments, processing system 904 may be implemented with an ARM, RISC, or x86 architecture, for example. In some embodiments, processing system 1204 may include an artificial intelligence (AI) accelerator. Some embodiments may use a combination of hardware accelerator and software running on a DSP or general purpose microcontroller. In some embodiments, processing system 1204 may be implemented with a plurality of processors and/or controllers. Other implementations are also possible.

As a non-limiting example, in an embodiment, processing system 1204 implements the radar processing chain (e.g., 102, 202, 302, 402, 502, 602, 702, 802) in a DSP or microcontroller, and the coprocessor (e.g., 104, 204, 304, 404, 504, 604, 704, 804) in an AI accelerator. Other implementations are also possible.

In some embodiments, millimeter-wave radar sensor 1202 and a portion or all of processing system 1204 may be implemented inside the same integrated circuit (IC). For example, in some embodiments, millimeter-wave radar sensor 1202 and a portion or all of processing system 1204 may be implemented in respective semiconductor substrates that are integrated in the same package. In other embodiments, millimeter-wave radar sensor 1202 and a portion or all of processing system 1204 may be implemented in the same monolithic semiconductor substrate. In some embodiments, millimeter-wave radar sensor 1202 and processing system 1204 are implemented in respective integrated circuits. In some embodiments, a plurality of integrated circuits is used to implement millimeter-wave radar sensor 1202. In some embodiments, a plurality of integrated circuits is used to implement processing system 1204. Other implementations are also possible.

As a non-limiting example, RF and analog circuits 1230 may be implemented, e.g., as shown in FIG. 12. During normal operation, voltage-controlled oscillator (VCO) 1236 generates radar signals, such as a linear frequency chirps (e.g., from 57 GHz to 64 GHz, or from 76 GHz to 77 GHz), which are transmitted by transmitting antenna 1214. The VCO 1236 is controlled by PLL 1234, which receives a reference clock signal (e.g., 80 MHz) from reference oscillator 1232. PLL 1234 is controlled by a loop that includes frequency divider 1238 and amplifier 1240. Amplifier 1237 may be used to drive transmitting antenna 1214.

The TX radar signals 1206 transmitted by transmitting antenna 1214 are reflected by objects in scene 1220 and received by receiving antenna 1216. The echo received by receiving antenna 1216 is mixed with a replica of the signal transmitted by transmitting antenna 1214 using mixer 1246 to produce intermediate frequency (IF) signal $x_{IF}(t)$ (also known as beat signal). In some embodiments, the beat signal $x_{IF}(t)$ has a bandwidth between 10 kHz and 1 MHz. Beat signals with a bandwidth lower than 10 kHz or higher than 1 MHz is also possible. Amplifier 1245 may be used to receive the reflected radar signals from antenna 1216.

Beat signal $x_{IF}(t)$ is filtered with low-pass filters (LPF) 1248 and then sampled by ADC 1212. ADC 1212 is advantageously capable of sampling the filtered beat signal $x_{out}(t)$ with a sampling frequency that is much smaller than the frequency of the signal received by receiving antenna 1216. Using FMCW radars, therefore, advantageously allows for a compact and low cost implementation of ADC 1212, in some embodiments.

The raw digital data $x_{out\_dig}(n)$, which in some embodiments include the digitized version of the filtered beat signal $x_{out}(t)$ is (e.g., temporarily) stored, e.g., in matrices of $N_c \times N_s$ per receiving antenna 1216, where $N_c$ is the number of chirps considered in a frame and $N_s$ is the number of transmit samples per chirp, for further processing by processing system 1204.

Figure 13:
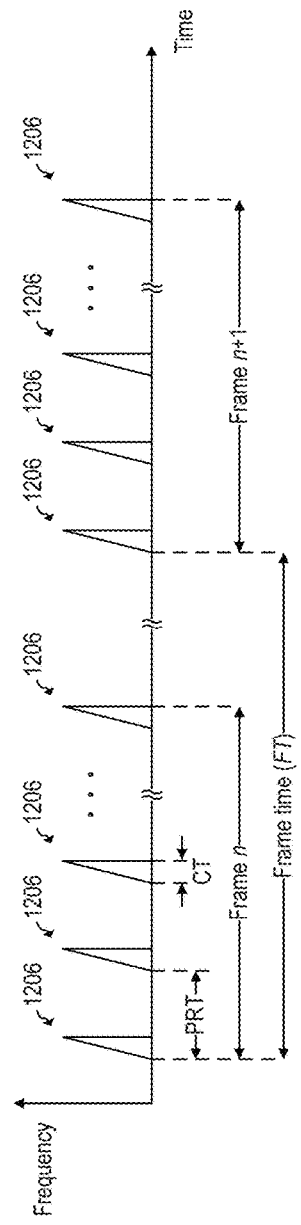
FIG. 13 shows a sequence of chirps transmitted by transmitting antenna of FIG. 12, according to an embodiment of the present invention.

FIG. 13 shows a sequence of chirps 1206 transmitted by TX antenna 1214, according to an embodiment of the present invention. As shown by FIG. 13, chirps 1206 are organized in a plurality of frames and may be implemented as up-chirps. Some embodiments may use down-chirps or a combination of up-chirps and down-chirps, such as up-down chirps and down-up chirps. Other waveform shapes may also be used.

As shown in FIG. 13, each frame may include a plurality of chirps 1206. For example, in some embodiments, the number of chirps in a frame is 16. Some embodiments may include more than 16 chirps per frame, such as 20 chirps, 32 chirps, or more, or less than 16 chirps per frame, such as 10 chirps, 8 chirps, or less. In some embodiments, each frame includes only a single chirp.

In some embodiments, frames are repeated every FT time. In some embodiments, FT time is 50 ms. A different FT time may also be used, such as more than 50 ms, such as 60 ms, 100 ms, 200 ms, or more, or less than 50 ms, such as 45 ms, 40 ms, or less.

In some embodiments, the FT time is selected such that the time between the beginning of the last chirp of frame n and the beginning of the first chirp of frame n+1 is equal to PRT. Other embodiments may use or result in a different timing.

The time between chirps of a frame is generally referred to as pulse repetition time (PRT). In some embodiments, the PRT is 5 ms. A different PRT may also be used, such as less than 5 ms, such as 4 ms, 2 ms, or less, or more than 5 ms, such as 6 ms, or more.

The duration of the chirp (from start to finish) is generally referred to as chirp time (CT). In some embodiments, the chirp time may be, e.g., 64 μs. Higher chirp times, such as 128 μs, or higher, may also be used. Lower chirp times, may also be used.

In some embodiments, the chirp bandwidth may be, e.g., 4 GHz. Higher bandwidth, such as 6 GHz or higher, or lower bandwidth, such as 2 GHz, 1 GHz, or lower, may also be possible.

In some embodiments, the sampling frequency of millimeter-wave radar sensor 902 may be, e.g., 1 MHz. Higher sampling frequencies, such as 2 MHz or higher, or lower sampling frequencies, such as 500 kHz or lower, may also be possible.

In some embodiments, the number of samples used to generate a chirp may be, e.g., 64 samples. A higher number of samples, such as 128 samples, or higher, or a lower number of samples, such as 32 samples or lower, may also be used.

Example embodiments of the present invention are summarized here. Other embodiments can also be understood from the entirety of the specification and the claims filed herein.

Example 1. A method including: receiving first radar data from a millimeter-wave radar sensor; receiving a set of hyperparameters with a radar processing chain; generating a first radar processing output using the radar processing chain based on the first radar data and the set of hyperparameters; updating the set of hyperparameters based on the first radar processing output using a hyperparameter selection neural network; receiving second radar data from the millimeter-wave radar sensor; and generating a second radar processing output using the radar processing chain based on the second radar data and the updated set of hyperparameters.

Example 2. The method of example 1, where the first radar processing output includes a first radar image.

Example 3. The method of one of examples 1 or 2, further including generating the first radar image using the radar processing chain based on an aggregation of a last m frames of the first radar data, where m is a positive integer greater than 1 and lower than or equal to 32.

Example 4. The method of one of examples 1 to 3, further including generating the first radar image by masking a range-angle image (RAI) or range-Doppler image (RDI) based on an output of an order statistics (OS) constant false alarm rate (CFAR) (OS-CFAR) detector.

Example 5. The method of one of examples 1 to 4, where the set of hyperparameters includes a probability of false alarm hyperparameter, a number of reference cells hyperparameter and a number of guard cell hyperparameter, where receiving the set of hyperparameters includes receiving the probability of false alarm hyperparameter, the number of reference cells hyperparameter, and the number of guard cell hyperparameter with the OS-CFAR detector.

Example 6. The method of one of examples 1 to 5, further including, generating a heatmap with a tracker of the radar processing chain, and where the first radar processing output includes the heatmap.

Example 7. The method of one of examples 1 to 6, where the radar processing chain includes a tracker, where the set of hyperparameters includes a gating threshold hyperparameter, and where receiving the set of hyperparameters includes receiving the gating threshold hyperparameter with the tracker.

Example 8. The method of one of examples 1 to 7, where the tracker includes an unscented Kalman filter.

Example 9. The method of one of examples 1 to 8, further including training the hyperparameter selection neural network.

Example 10. The method of one of examples 1 to 9, where training the hyperparameter selection neural network includes training the hyperparameter selection neural network using imitation learning.

Example 11. The method of one of examples 1 to 10, where training the hyperparameter selection neural network further includes, after training the hyperparameter selection neural network using imitation learning, training the hyperparameter selection neural network using reinforcement learning.

Example 12. The method of one of examples 1 to 11, where training the hyperparameter selection neural network using reinforcement learning includes using a value neural network for providing a value function and a lower triangular neural network for providing a lower triangular matrix, where a Q function is based on the value function and the lower triangular matrix.

Example 13. The method of one of examples 1 to 12, where training the hyperparameter selection neural network further includes using curriculum learning during reinforcement learning.

Example 14. The method of one of examples 1 to 13, further including using a reward function based on missed detections, false alarms, and error distances between predicted and actual target locations during reinforcement learning.

Example 15. The method of one of examples 1 to 14, further including determining the error distances using Mahalanobis distances between predicted and actual target locations.

Example 16. The method of one of examples 1 to 15, further including determining the error distances using Euclidean distances between predicted and actual target locations.

Example 17. A method including: receiving first radar data from a millimeter-wave radar sensor; receiving a set of hyperparameters with a radar processing chain including a tracker; generating a first radar image using the radar processing chain based on the first radar data and the set of hyperparameters; tracking a target using the tracker based on the first radar image and the set of hyperparameters; updating the set of hyperparameters based on the first radar image using a hyperparameter selection neural network; receiving second radar data from the millimeter-wave radar sensor; and generating a second radar image using the radar processing chain based on the second radar data and the updated set of hyperparameters.

Example 18. The method of example 17, where the target is a human target.

Example 19. The method of one of examples 17 or 18, where the target is a heartbeat rate of a human.

Example 20. The method of one of examples 17 to 19, where the tracker includes a Kalman filter.

Example 21. A millimeter-wave radar system including: a millimeter-wave radar sensor configured to transmit radar signals and receive reflected radar signals, and generate radar data based on the reflected radar signals; and a processing system including: a radar processing chain configured to generate a first radar processing output based on the radar data and a set of hyperparameters, and a hyperparameter selection neural network configured to update the set of hyperparameters based on the first radar processing output, where the radar processing chain is configured to generate a second radar processing output based on the radar data and the updated set of hyperparameters.

Example 22. The millimeter-wave radar system of example 21, where the radar processing chain is configured to track a target based on the radar data.

Example 23. The millimeter-wave radar system of one of examples 21 or 22, where the radar data includes a plurality of consecutive frames, and where the hyperparameter selection neural network is configured to update the set of hyperparameters every n frames of the radar data, where n is a positive integer greater than or equal to 1.

Example 24. The millimeter-wave radar system of one of examples 21 to 23, where the hyperparameter selection neural network includes an initial layer, a plurality of convolutional layers, and a plurality of dense layers.

Example 25. The millimeter-wave radar system of one of examples 21 to 24, where the first radar processing output includes a radar image and a masked radar image.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
 receiving first radar data from a millimeter-wave radar sensor;
 receiving a set of hyperparameters with a radar processing chain, wherein the hyperparameters are configuration parameters governing behavior and performance of the radar processing chain;
 generating a first radar processing output using the radar processing chain based on the first radar data and the set of hyperparameters;
 updating the set of hyperparameters based on the first radar processing output using a hyperparameter selection neural network;
 receiving second radar data from the millimeter-wave radar sensor;

generating a second radar processing output using the radar processing chain based on the second radar data and the updated set of hyperparameters;

training the hyperparameter selection neural network using imitation learning;

after training the hyperparameter selection neural network using imitation learning, training the hyperparameter selection neural network using reinforcement learning; and using a reward function based on missed detections, false alarms, and error distances between predicted and actual target locations during reinforcement learning.

2. The method of claim 1, wherein the first radar processing output comprises a first radar image.

3. The method of claim 2, further comprising generating the first radar image using the radar processing chain based on an aggregation of a last m frames of the first radar data, wherein m is a positive integer greater than 1 and lower than or equal to 32.

4. The method of claim 2, further comprising generating the first radar image by masking a range-angle image (RAI) or range-Doppler image (RDI) based on an output of an order statistics (OS) constant false alarm rate (CFAR) (OS-CFAR) detector.

5. The method of claim 4, wherein the set of hyperparameters comprises a probability of false alarm hyperparameter, a number of reference cells hyperparameter and a number of guard cell hyperparameter, wherein receiving the set of hyperparameters comprises receiving the probability of false alarm hyperparameter, the number of reference cells hyperparameter, and the number of guard cell hyperparameter with the OS-CFAR detector.

6. A millimeter-wave radar system comprising:
a millimeter-wave radar sensor configured to transmit radar signals and receive reflected radar signals, and generate radar data based on the reflected radar signals, wherein the radar data comprises first radar data and second radar data; and
a processing system comprising:
a receiver configured to:
receive the first radar data from the millimeter-wave radar sensor,
receive the second radar data from the millimeter-wave radar sensor,
a radar processing chain configured to:
generate a first radar processing output based on the radar data and a set of hyperparameters, wherein the hyperparameters are configuration parameters governing behavior and performance of the radar processing chain, and
a hyperparameter selection neural network configured to:
update the set of hyperparameters based on the first radar processing output, wherein the radar processing chain is configured to generate a second radar processing output based on the second radar data and the updated set of hyperparameters, wherein the set of hyperparameters comprises a probability of false alarm hyperparameter, a number of reference cells hyperparameter or a number of guard cell hyperparameter, wherein the radar processing chain is configured to receive the set of hyperparameters by receiving the probability of false alarm hyperparameter, the number of reference cells hyperparameter, or the number of guard cell hyperparameter with an order statistics (OS) constant false alarm rate (CFAR) (OS-CFAR) detector.

7. The millimeter-wave radar system of claim 6, wherein the radar processing chain is configured to track a target based on the radar data.

8. The millimeter-wave radar system of claim 6, wherein the radar data comprises a plurality of consecutive frames, and wherein the hyperparameter selection neural network is configured to update the set of hyperparameters every n frames of the radar data, wherein n is a positive integer greater than or equal to 1.

9. The millimeter-wave radar system of claim 6, wherein the hyperparameter selection neural network comprises an initial layer, a plurality of convolutional layers, and a plurality of dense layers.

10. The millimeter-wave radar system of claim 6, wherein the first radar processing output comprises a radar image and a masked radar image.

11. A method comprising:
receiving first radar data from a millimeter-wave radar sensor;
receiving a set of hyperparameters with a radar processing chain, the set of hyperparameters comprising a probability of false alarm hyperparameter, a number of reference cells hyperparameter or a number of guard cell hyperparameter, wherein receiving the set of hyperparameters comprises receiving the probability of false alarm hyperparameter, the number of reference cells hyperparameter, or the number of guard cell hyperparameter with an order statistics (OS) constant false alarm rate (CFAR) (OS-CFAR) detector;
generating a first radar processing output using the radar processing chain based on the first radar data and the set of hyperparameters;
updating the set of hyperparameters based on the first radar processing output using a hyperparameter selection neural network;
receiving second radar data from the millimeter-wave radar sensor; and
generating a second radar processing output using the radar processing chain based on the second radar data and the updated set of hyperparameters.

12. The method of claim 11, further comprising, generating a heatmap with a tracker of the radar processing chain, and wherein the first radar processing output comprises the heatmap.

13. The method of claim 11, wherein the radar processing chain comprises a tracker, wherein the set of hyperparameters comprises a gating threshold hyperparameter, and wherein receiving the set of hyperparameters comprises receiving the gating threshold hyperparameter with the tracker.

14. The method of claim 11, wherein the radar processing chain comprises a tracker, and the tracker comprises an unscented Kalman filter.

15. The method of claim 11, further comprising training the hyperparameter selection neural network.

16. The method of claim 15, wherein training the hyperparameter selection neural network comprises training the hyperparameter selection neural network using imitation learning.

17. The method of claim 16, wherein training the hyperparameter selection neural network further comprises, after training the hyperparameter selection neural network using imitation learning, training the hyperparameter selection neural network using reinforcement learning.

18. The method of claim 17, wherein training the hyperparameter selection neural network using reinforcement learning comprises using a value neural network for providing a value function and a lower triangular neural network for providing a lower triangular matrix, wherein a Q function is based on the value function and the lower triangular matrix.

19. The method of claim 17, wherein training the hyperparameter selection neural network further comprises using curriculum learning during reinforcement learning.

20. The method of claim 17, further comprising using a reward function based on missed detections, false alarms, and error distances between predicted and actual target locations during reinforcement learning.

21. The method of claim 20, further comprising determining the error distances using Mahalanobis distances between predicted and actual target locations.

22. The method of claim 20, further comprising determining the error distances using Euclidean distances between predicted and actual target locations.

23. The method of claim 11, wherein:
the first radar processing output comprises a first radar image;
the radar processing chain comprises a tracker;
the method further comprises tracking a target using the tracker based on the first radar image and the set of hyperparameters; and
updating the set of hyperparameters based on the first radar processing output using the hyperparameter selection neural network comprises updating the set of hyperparameters based on the first radar image using the hyperparameter selection neural network.

24. The method of claim 23, wherein the target is a human target.

25. The method of claim 23, wherein the target is a heartbeat rate of a human.

26. The method of claim 23, wherein the tracker comprises a Kalman filter.

* * * * *